United States Patent
Jeong et al.

(10) Patent No.: US 10,942,597 B2
(45) Date of Patent: Mar. 9, 2021

(54) DISPLAY APPARATUS INCLUDING A TOUCH DRIVING CIRCUIT

(71) Applicants: SAMSUNG DISPLAY CO., LTD., Yongin-si (KR); SEOUL NATIONAL UNIVERSITY R&DB FOUNDATION, Seoul (KR)

(72) Inventors: Deog-Kyoon Jeong, Seoul (KR); Youngmin Park, Gwangmyeong-Si (KR); Sangjin Pak, Yongin-Si (KR); Jiheon Park, Seoul (KR); Jonghyun Oh, Seoul (KR); Sanghun Park, Cheonan-Si (KR)

(73) Assignees: SAMSUNG DISPLAY CO., LTD., Yongin-si (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 61 days.

(21) Appl. No.: 16/503,741

(22) Filed: Jul. 5, 2019

(65) Prior Publication Data
US 2020/0012375 A1    Jan. 9, 2020

(51) Int. Cl.
*G06F 3/041* (2006.01)

(52) U.S. Cl.
CPC .......... *G06F 3/0416* (2013.01); *G06F 3/0412* (2013.01)

(58) Field of Classification Search
CPC ............................ G06F 3/0416; G06F 3/0412
USPC ....................................................... 345/173
See application file for complete search history.

(56) References Cited

U.S. PATENT DOCUMENTS

| | | | |
|---|---|---|---|
| RE37,552 E | 2/2002 | Svensson et al. | |
| 9,595,216 B2 | 3/2017 | Park et al. | |
| 2015/0346887 A1* | 12/2015 | Cho ...................... | G06F 1/3262 345/174 |
| 2016/0005363 A1* | 1/2016 | Van Lier .............. | G09G 3/3466 345/212 |
| 2017/0090624 A1* | 3/2017 | Kwon ................... | G06F 3/0416 |
| 2017/0108987 A1 | 4/2017 | Park et al. | |
| 2017/0205933 A1 | 7/2017 | Kwon et al. | |
| 2019/0095032 A1 | 3/2019 | Park et al. | |

FOREIGN PATENT DOCUMENTS

| KR | 10-1716781 | 3/2017 |
|---|---|---|
| KR | 10-2017-0045436 | 4/2017 |
| KR | 10-2017-0086752 | 7/2017 |
| KR | 10-2019-0035992 | 4/2019 |

\* cited by examiner

*Primary Examiner* — Amare Mengitsu
*Assistant Examiner* — Gloryvid Figueroa-Gibson
(74) *Attorney, Agent, or Firm* — F. Chau & Associates, LLC

(57) ABSTRACT

A display apparatus includes a display panel, a touch sensing unit, and a touch driving circuit. The touch sensing unit includes a transmission touch line. The touch driving circuit provides a touch driving signal to the transmission touch line. The touch driving circuit may include a switch group and a control switch group. The switch group may include a plurality of switch devices, each of which has one end connected to the transmission touch line. The control switch group may be connected to the other end of at least a portion of the switch devices, include a plurality of control switch devices and a capacitor device, and receive a driving voltage and a ground voltage. The touch driving signal has N voltage levels, where N is a natural number of 3 or more.

16 Claims, 19 Drawing Sheets

DISPLAY APPARATUS INCLUDING A TOUCH DRIVING CIRCUIT

CROSS-REFERENCE TO RELATED APPLICATION

This U.S. non-provisional patent application claims priority under 35 U.S.C. § 119 to Korean Patent Application No. 10-2018-0078680, filed on Jul. 6, 2018 in the Korean Intellectual Property Office, the disclosure of which is incorporated by reference herein in its entirety.

TECHNICAL FIELD

Exemplary embodiments of the inventive concept herein relate to a display apparatus, and more particularly, to a display apparatus including a touch driving circuit.

DISCUSSION OF RELATED ART

Various display devices used in multimedia devices such as televisions, mobile phones, tablet computers, navigation devices, and game consoles are being developed. A display device may include a keyboard or a mouse as an input unit. Additionally, in recent years, a display device may include a touch panel as an input unit.

A touch sensing function of the touch panel that is always activated while the display apparatus is turned on may consume a lot of power.

SUMMARY

According to an exemplary embodiment of the inventive concept, a display apparatus may include a display panel, a touch sensing unit, and a touch driving circuit. The touch sensing unit may be disposed on the display panel and include a first transmission touch line and a second transmission touch line, which are spaced apart from each other. The touch driving circuit may provide a first touch driving signal to the first transmission touch line and provide a second touch driving signal to the second transmission touch line. The touch driving circuit may include a first switch group, a second switch group, and a control switch group. The first switch group may include a plurality of first switch group devices, each of which has one end coupled to the first transmission touch line. The second switch group may include a plurality of second switch group devices, each of which has one end connected to the second transmission touch line. The control switch group may be connected to the other end of at least a portion of the plurality of first switch group devices and the other end of at least a portion of the plurality of second switch group devices, include a plurality of control switch devices and a capacitor device, and receive a driving voltage and a ground voltage. Each of the first touch driving signal and the second touch driving signal may have N voltage levels, where N may be a natural number of 3 or more.

In an exemplary embodiment of the inventive concept, the plurality of first switch group devices may include a first ground switch device, a first intermediate switch device, and a first driving switch device. The first ground switch device may have the other end configured to receive the ground voltage. The first intermediate switch device may have the other end configured to receive the driving voltage. The first driving switch device may have the other end connected to the control switch group.

In an exemplary embodiment of the inventive concept, the control switch group may include a capacitor device and first to fourth control switch devices. The capacitor device may include a first electrode and a second electrode, which face each other. The first control switch device may include one end configured to receive the driving voltage and the other end connected to the first electrode of the capacitor device. The second control switch device may include one end configured to receive the ground voltage and the other end connected to the first electrode of the capacitor device. The third control switch device may include one end configured to receive the driving voltage and the other end connected to the second electrode of the capacitor device. The fourth control switch device may include one end connected to the other end of the first control switch device and the other end connected to the second electrode of the capacitor device.

In an exemplary embodiment of the inventive concept, the plurality of first switch group devices may further include a first lower switch device and a first upper switch device. The first lower switch device may have the other end connected to the first electrode of the capacitor device. The first upper switch device may have the other end connected to the second electrode of the capacitor device.

In an exemplary embodiment of the inventive concept, N may be 5.

In an exemplary embodiment of the inventive concept, the plurality of second switch group devices may include a second ground switch device, a second intermediate switch device, and a second driving switch device. The second ground switch device may have the other end configured to receive the ground voltage. The second intermediate switch device may have the other end configured to receive the driving voltage. The second driving switch device may have the other end connected to the control switch group.

In an exemplary embodiment of the inventive concept, the plurality of second switch group devices may further include a second lower switch device and a second upper switch device. The second lower switch device may have the other end connected to the first electrode of the capacitor device. The second upper switch device may have the other end connected to the second electrode of the capacitor device.

In an exemplary embodiment of the inventive concept, the first ground switch device, the first lower switch device, the first intermediate switch device, the first upper switch device, and the first driving switch device may be turned on in sequence or in reverse order. The second ground switch device, the second lower switch device, the second intermediate switch device, the second upper switch device, and the second driving switch device may be turned on in sequence or in reverse order.

In an exemplary embodiment of the inventive concept, the second control switch device and the third control switch device may be turned on during the same period as the first intermediate switch device and the second intermediate switch device.

In an exemplary embodiment of the inventive concept, the first control switch device and the fourth control switch device may be turned on during a period in which the first ground switch device and the second driving switch device are turned on. The first control switch device and the fourth control switch device may be turned on during a period in which the first driving switch device and the second ground switch device are turned on.

In an exemplary embodiment of the inventive concept, the first touch driving signal and the second touch driving signal may have phases different from each other during a specific period.

In an exemplary embodiment of the inventive concept, the first touch driving signal may have a first phase during a first phase period and a second phase different from the first phase during a second phase period different from the first phase period.

In an exemplary embodiment of the inventive concept, the touch sensing unit may further include a plurality of sensing touch lines electrically connected to the first and second transmission touch lines.

In an exemplary embodiment of the inventive concept, each of the first and second touch driving signals may sequentially increase or decrease between the ground voltage and a double value of the driving voltage.

According to an exemplary embodiment of the inventive concept, a display device includes a display panel, a touch sensing unit, and a touch driving circuit. The touch sensing unit may be disposed on the display panel and include a transmission touch line. The touch driving circuit may receive a driving voltage and a ground voltage and provide a touch driving signal to the transmission touch line. The touch driving circuit may include a switch group and a control switch group. The switch group may include a plurality of switch devices, each of which has one end connected to the transmission touch line. The control switch group may be connected to the other ends of at least portions of the plurality of switch devices, include a plurality of control switch devices and a capacitor device, and receive the driving voltage and the ground voltage. The touch driving signal may have N voltage levels, where N may be a natural number of 3 or more.

In an exemplary embodiment of the inventive concept, the touch driving signal may sequentially increase or decrease between the ground voltage and a double value of the driving voltage.

In an exemplary embodiment of the inventive concept, the number of the plurality of switch devices may be N.

In an exemplary embodiment of the inventive concept, N may be 5.

According to an exemplary embodiment of the inventive concept, a display device includes a display panel, a touch sensing unit, and a touch driving circuit. The touch sensing unit may be disposed on the display panel and include a first transmission touch line and a second transmission touch line, which are spaced apart from each other. The touch driving circuit may receive a ground voltage and a driving voltage, which are different from each other, include a plurality of switch devices and one capacitor device, provide a first touch driving signal to the first transmission touch line, and provide a second touch driving signal to the second transmission touch line. Each of the first touch driving signal and the second touch driving signal may have N voltage levels, where N may be a natural number of 3 or more. Each of the first touch driving signal and the second touch driving signal may sequentially increase or decrease between the ground voltage and a double value of the driving voltage.

In an exemplary embodiment of the inventive concept, each of the first touch driving signal and the second touch driving signal may increase or decrease in units of half of a voltage difference between the driving voltage and the ground voltage.

BRIEF DESCRIPTION OF THE FIGURES

The above and other features of the inventive concept will become more apparent by describing in detail exemplary embodiments thereof with reference to the accompanying drawings.

DETAILED DESCRIPTION OF THE EMBODIMENTS

Figure 1:
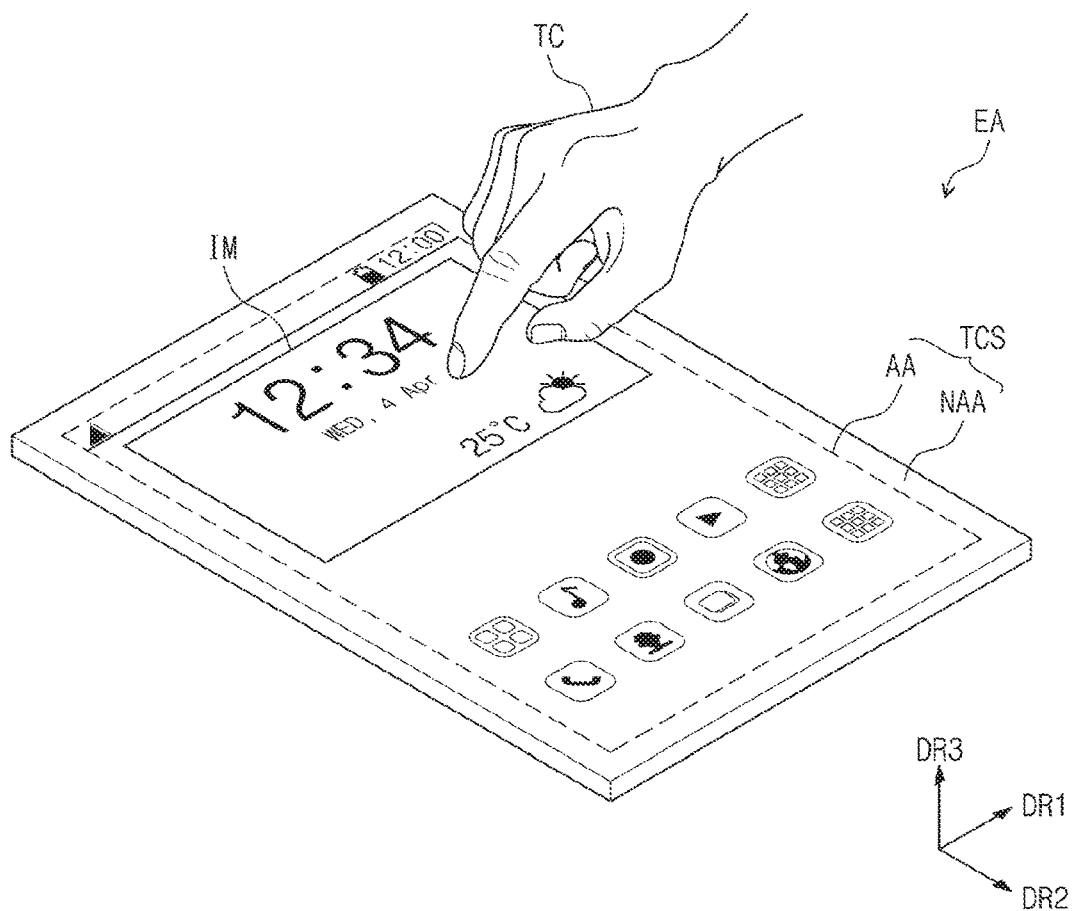
FIG. 1 is a schematic perspective view of a display apparatus according to an exemplary embodiment of the inventive concept.

Exemplary embodiments of the inventive concept provide a display apparatus including a touch driving circuit that is capable of improving power consumption.

Hereinafter, exemplary embodiments of the inventive concept will be described with reference to the accompanying drawings. Like reference numerals may refer to like elements throughout this application.

In this specification, it will also be understood that when one component (or region, layer, portion, etc.) is referred to as being 'on', 'connected to', or 'coupled to' another component, it can be directly disposed/connected/coupled on/to the one component, or an intervening third component may also be present.

Additionally, FIG. 1 is a schematic perspective view of a display apparatus according to an exemplary embodiment of the inventive concept.

Referring to FIG. 1, a display apparatus EA may be a touch screen apparatus. The touch screen apparatus may be at least one of a smart phone, a tablet personal computer, a mobile phone, an e-book reader, a note book, a personal digital assistant (PDS), a portable multimedia player (PMP), an MP3 player, a mobile medical device, a camera, or a wearable display device.

The display device EA provides a touch screen surface TCS. The touch screen surface TCS may be the outermost surface of the display apparatus EA, be exposed to the outside to provide an image to a user, and be a target surface of an external input TC.

The touch screen surface TCS may display an image IM to provide the image IM to the user or communicate with the user. Additionally, the touch screen surface TCS may sense the external input TC. Although the external input TC is exemplarily shown as a user's hand, the inventive concept is not limited thereto. For example, the external input TC may be a stylus pen or a hovering input according to a sensing device provided in the display apparatus EA.

The touch screen surface TCS may include an active area AA and a peripheral area NAA, which will be described in detail below.

The display apparatus EA may have various outer appearances. The display apparatus EA may have a short side extending in a first direction DR1 and a long side extending in a second direction DR2. A thickness direction of the display apparatus EA may be referred to as a third direction DR3.

Figure 2:
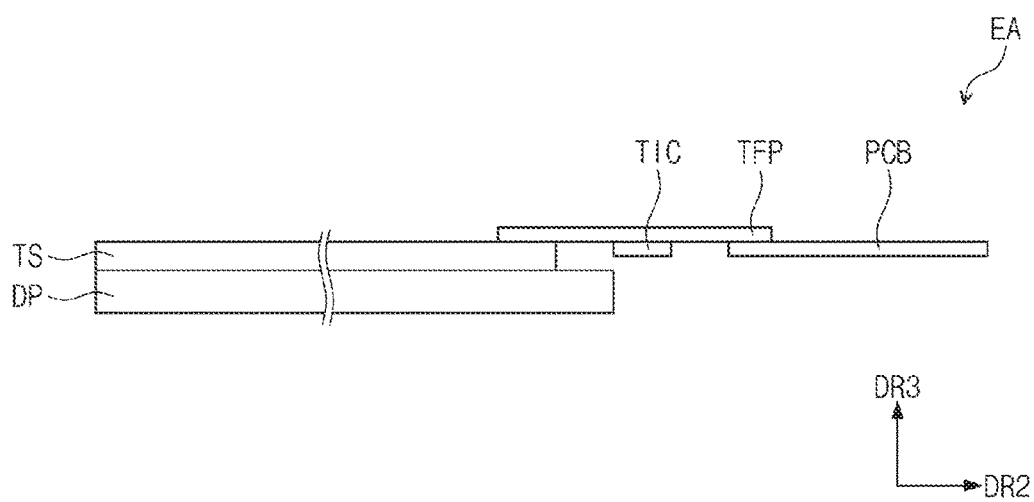
FIG. 2 is a cross-sectional view of the display apparatus of FIG. 1 according to an exemplary embodiment of the inventive concept.

FIG. 2 is a cross-sectional view of the display apparatus of FIG. 1 according to an exemplary embodiment of the inventive concept.

FIG. 2 is a cross-sectional view of the display apparatus EA according to an exemplary embodiment of the inventive concept. FIG. 2 illustrates a cross-section defined by the second direction DR2 and the third direction DR3.

The display apparatus EA includes a display panel DP, a touch sensing unit TS, a touch flexible printed circuit (FPC) (TFP), a touch driving chip TIC, and a printed circuit board PCB. The display apparatus EA according to an exemplary embodiment of the inventive concept may further include a protection member disposed on a bottom surface of the display panel DP and an antireflection member and/or a window member disposed on a top surface of the touch sensing unit TS.

The display panel DP may display an image. The display panel DP may be provided as various panels such as an organic light emitting display panel, a liquid crystal display panel, a plasma display panel, an electrophoretic display panel, an electrowetting display panel, or the like. Hereinafter, the organic light emitting display panel will be described as an example of the display panel DP.

The touch sensing unit TS acquires coordinates information of the external input. The touch sensing unit TS is disposed on the display panel DP. The touch sensing unit TS may be provided as an independent module and attached to the display panel by using an adhesion layer. According to an exemplary embodiment of the inventive concept, the touch sensing unit TS may be attached to the display panel DP without using an adhesive and be formed through a continuous process of the display panel DP.

The touch sensing unit TS may have a multilayer structure. The touch sensing unit TS may include a conductive layer having a single layer or multilayer structure. The touch sensing unit TS may include a plurality of insulation layers each of which has a single layer or multilayer structure.

The touch FPC (TFP) is electrically connected to the touch sensing unit TS. The touch FPC (TFP) may include lines electrically connecting the touch driving chip TIC to the touch sensing unit TS. The touch FPC (TFP) may be made of a flexible material to be bendable. The touch FPC (TFP) may be bent to a lower side of the display panel DP so that the printed circuit board PCB is disposed on a rear surface of the display panel DP. Although the touch FPC (TFP) is attached to the top surface of the touch sensing unit TS in FIG. 2, the inventive concept is not limited thereto. For example, the touch FPC (TFP) may be attached to the display panel DP, and the display panel DP and the touch sensing unit TS may be electrically connected to each other.

The touch driving chip TIC may be mounted on the touch FPC (TFP). However, the inventive concept is not limited thereto. According to an exemplary embodiment, the touch driving chip TIC may be mounted on the display panel DP.

The touch driving chip TIC may include at least a portion of the touch driving circuit. The touch driving circuit may include a plurality of electronic devices and lines. The touch driving circuit may provide a touch driving signal for driving the touch sensing unit TS and receive a sensing signal from the touch sensing unit TS. The touch driving circuit may include a switching device to generate the touch driving signal having a plurality of levels. Detailed descriptions will be provided later.

The printed circuit board PCB is connected to the touch FPC (TFP). The printed circuit board PCB may receive a sensing signal from the touch driving chip TIC and provide a power voltage for generating the touch driving signal.

The display apparatus EA may further include a flexible printed circuit board connected to the display panel DP. The flexible printed circuit board may provide a signal for driving the display panel DP.

Figure 3:
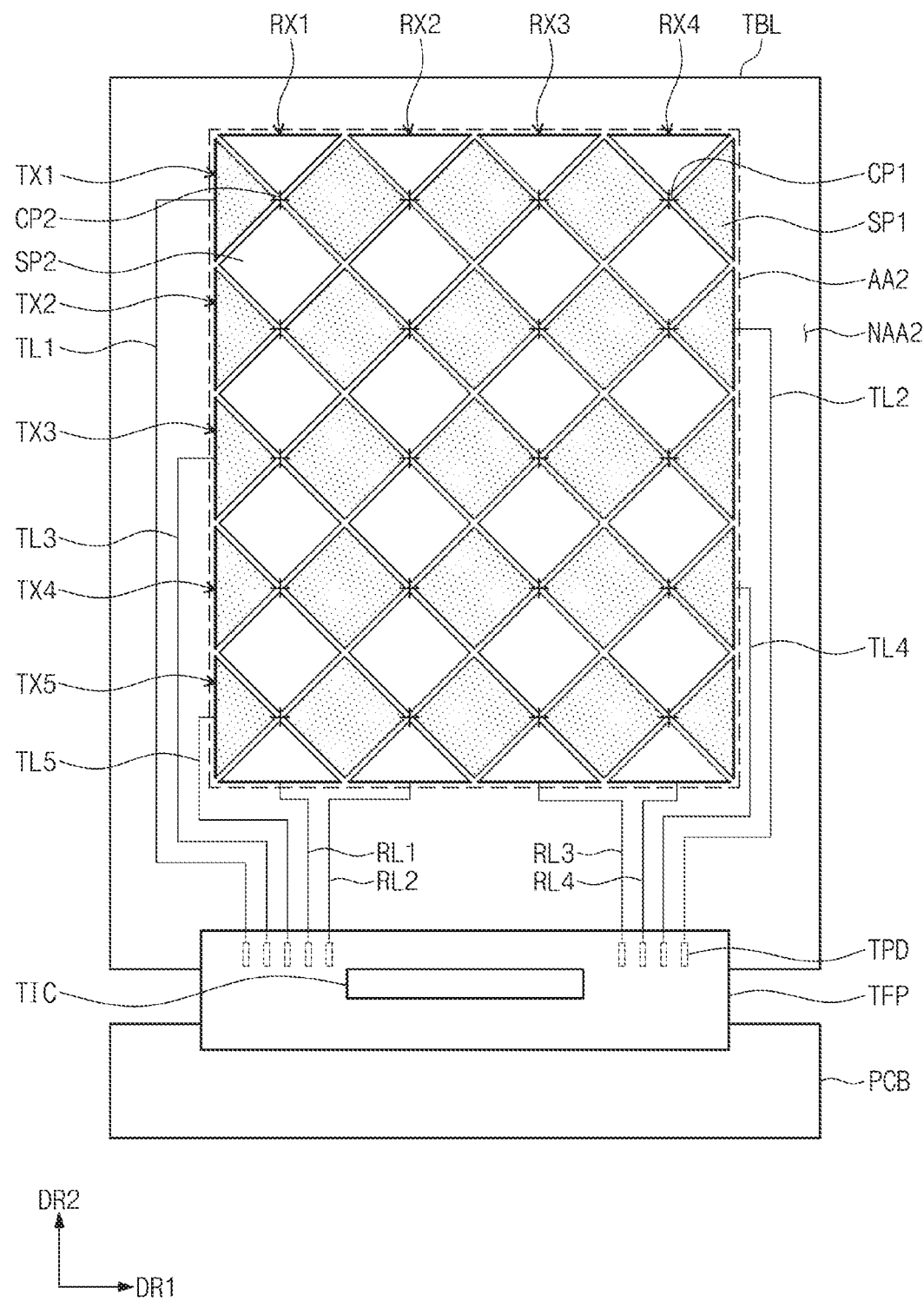
FIG. 3 is a plan view of a touch flexible printed circuit (FPC) on which a touch sensing unit and a touch driving chip of FIG. 2 are mounted according to an exemplary embodiment of the inventive concept.

FIG. 3 is a plan view of a touch FPC on which a touch sensing unit and a touch driving chip of FIG. 2 are mounted according to an exemplary embodiment of the inventive concept.

The touch sensing unit TS may be implemented in a capacitive manner. The touch sensing unit TS may operate through one of a manner of extracting touch coordinates based on a variation in capacitance of a capacitor constituted by two kinds of insulated touch lines extending in different directions and a manner of extracting touch coordinates based on a variation in capacitance of a capacitor constituted by a plurality of touch electrodes with an active area. Hereinafter, a structure in which the touch sensing unit TS operates in an electronic manner will be exemplarily described.

The touch sensing unit TS may be divided into an active area AA2 and a peripheral area NAA2. The touch sensing unit TS may sense touch inputted into the active area AA2 of the touch sensing unit TS, but may not sense touch inputted into the peripheral area NAA2.

The touch sensing unit TS may include a base layer TBL, a plurality of transmission touch lines TX1 to TX5, a plurality of sensing touch lines RX1 to RX4, a plurality of transmission lines TL1 to TL5, a plurality of sensing lines RL1 to RL5, and touch pads TPD.

Each of the transmission touch lines TX1 to TX5 includes a plurality of transmission touch sensing parts SP1 and a plurality of connection parts CP1. The transmission touch sensing parts SP1 are arranged in the first direction DR1. Each of the first connection parts CP1 connects two transmission touch sensing parts SP1, which are adjacent to each other, of the transmission touch sensing parts SP1. Each of the transmission touch sensing parts SP1 may have a mesh shape having openings therein.

The sensing touch lines RX1 to RX4 cross the transmission touch lines TX1 to TX5 to be insulated from one another. Each of the sensing touch lines RX1 to RX4 includes a plurality of sensing touch sensing parts SP2 and a plurality of second connection parts CP2. The sensing touch sensing parts SP2 are arranged in the second direction DR2. Each of the second connection parts CP2 connects two sensing touch sensing parts SP2, which are adjacent to each other, of the sensing touch sensing parts SP2. Each of the sensing touch sensing parts SP2 may have a mesh shape having openings therein.

According to an exemplary embodiment of the inventive concept, the transmission touch sensing parts SP1 and the first connection parts CP1 may be disposed on a first layer, and the sensing touch sensing parts SP2 and the second connection parts CP2 may be disposed on a second layer different from the first layer. According to an exemplary embodiment of the inventive concept, the transmission touch sensing parts SP1, the first connection parts CP1, and the sensing touch sensing parts SP2 may be disposed on the first layer, and the second connection parts CP2 may be disposed on the second layer different from the first layer.

The transmission touch lines TX1 to TX5 and the sensing touch lines RX1 to RX4 constitute a touch capacitor. The touch sensing unit TS may sense touch input coordinates based on a variation in capacitance of the touch capacitor.

Each of the transmission lines TL1 to TL5 may have one end connected to each of the transmission touch lines TX1 to TX5. Each of the transmission lines TL1 to TL5 may have the other end connected to each of the touch pads TPD. The transmission lines TL1 to TL5 may provide touch driving signals applied from the touch driving chip TIC through the touch pads TPD to the transmission touch lines TX1 to TX5.

Each of the sensing lines RL1 to RL4 may have one end connected to one of the sensing touch lines RX1 to RX4. Each of the sensing lines RL1 to RL4 may have the other end connected to one of the touch pads TPD. The sensing lines RL1 to RL4 may provide sensing signals received from the sensing touch lines RX1 to RX4 through the touch pads TPD to the touch driving chip TIC.

Figure 4:
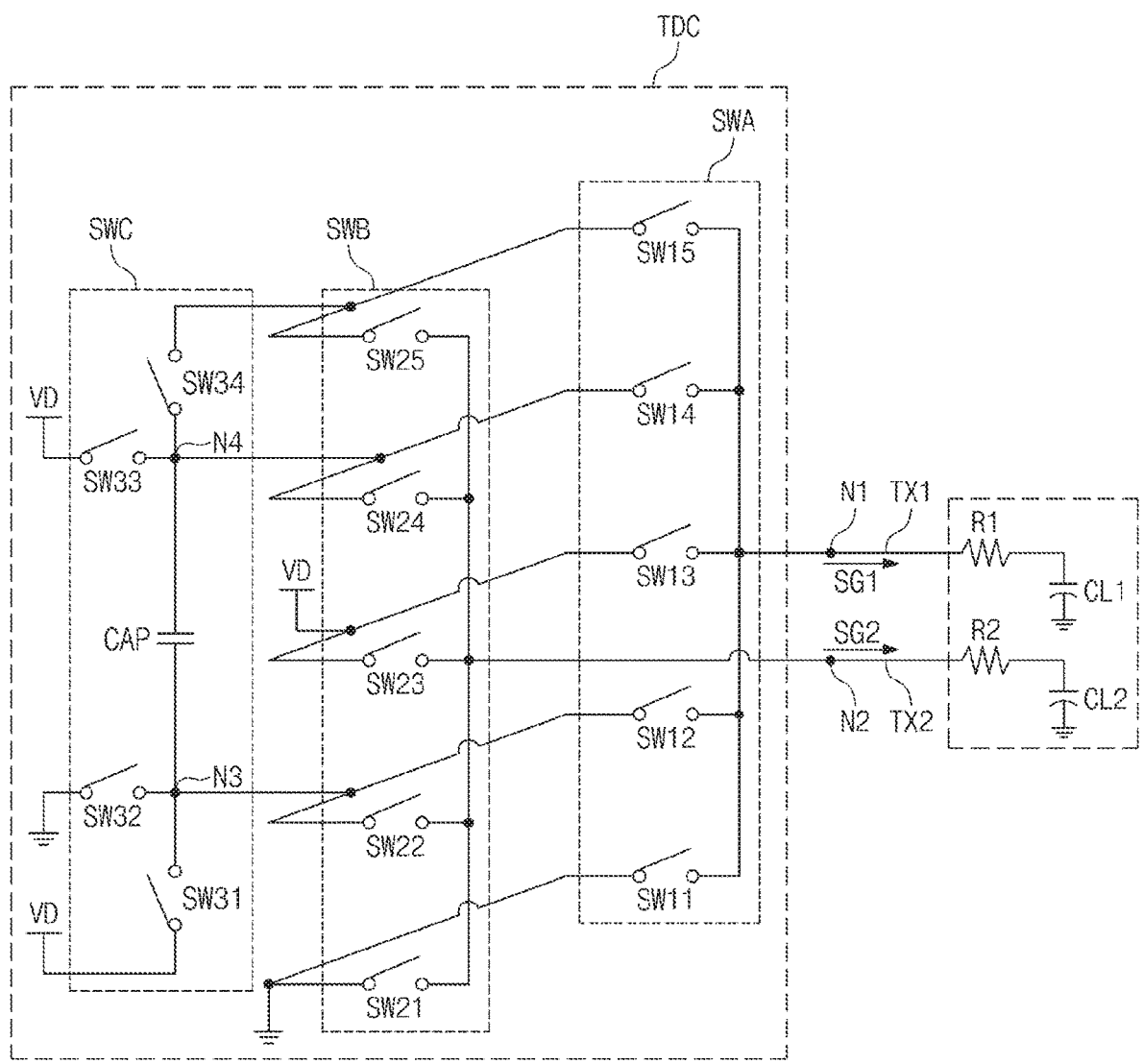
FIG. 4 is a circuit diagram of a touch driving circuit and transmission touch lines according to an exemplary embodiment of the inventive concept.

FIG. 4 is a circuit diagram of a touch driving circuit and transmission touch lines according to an exemplary embodiment of the inventive concept.

FIG. 4 illustrates an example of a portion of the touch driving circuit for driving first and second transmission touch lines TX1 and TX2 of the transmission touch lines and two transmission touch lines. The touch driving circuits respectively connected to the transmission touch lines TX1 to TX5 of FIG. 3 may be substantially the same.

In FIG. 4, the first transmission touch line TX1 may be modeled by an equivalent circuit including a first resistor R1 and a first load capacitor CL1. The first resistor R1 represents a line resistor of the first transmission touch line TX1, and the first load capacitor CL1 may represent a capacitor constituted by a line and an electrode (an upper cathode electrode of the organic light emitting display panel) around the line. Similarly, the second transmission touch line TX2 may be modeled by an equivalent circuit including a second resistor R2 and a second load capacitor CL2.

The touch driving circuit TDC may include switch groups SWA and SWB electrically connected to the transmission touch lines TX1 and TX2 and a control switch group SWC.

For example, an external constituent of the touch driving circuit TDC may receive and ground a driving voltage VD from the printed circuit board PCB of FIG. 2. The touch driving circuit TDC receives the driving voltage VD and generates touch driving signals SG1 and SG2 having a plurality of voltage levels by using the switch groups SWA and SWB and the control switch group SWC. Hereinafter, "grounded" may mean reception of a ground voltage. The driving voltage VD may be greater than the ground voltage.

The touch driving circuit TDC generates a first touch driving signal SG1 to be provided to the first transmission touch line TX1 and also generates a second touch driving signal SG2 to be provided to the second transmission touch line TX2. The first touch driving signal SG1 may be a signal measured at a first node N1 of FIG. 4 and may be measured at an output terminal of the touch driving chip TIC of FIG. 2. The second touch driving signal SG2 may be a signal measured at a second node N2 of FIG. 4 and may be measured at an output terminal of the touch driving chip TIC of FIG. 2.

Hereinafter, a case in which the touch driving circuit TDC according to an exemplary embodiment of the inventive concept generates a touch driving signal having five voltage levels will be exemplarily described.

The switch groups SWA and SWB include a first switch group SWA connected to the first transmission touch line TX1 and a second switch group SWB connected to the second transmission touch line TX2. The switch groups SWA and SWB may be provided in the touch driving chip TIC of FIG. 2.

The first switch group SWA and the second switch group SWB may be independently controlled with respect to each other.

The switch devices provided in the switch groups SWA and SWB may be realized as transistors. The switch devices provided in the switch groups SWA and SWB may be referred to as switch group devices.

To receive the driving voltage VD to generate N voltage levels, the number of switch devices provided in each of the switch groups SWA and SWB may be N, and the number of capacitor devices may be N−4. Detailed descriptions will be provided later.

The first switch group SWA may include first to fifth switch devices SW11 to SW15.

Each of the first to fifth switch devices SW11 to SW15 may have one end connected to the first transmission touch line TX1.

The first switch device SW11 has the other end connected to the ground. The first switch device SW11 may be referred to as a first ground switch device.

The second switch device SW12 has the other end connected to the control switch group SWC. The second switch device SW12 may be referred to as a first lower switch device.

The third switch device SW13 has the other end receiving the driving voltage VD.

The third switch device SW13 may be referred to as a first intermediate switch device.

The fourth switch device SW14 has the other end connected to the control switch group SWC. The fourth switch device SW14 may be referred to as a first upper switch device.

The fifth switch device SW15 has the other end connected to the control switch group SWC. The fifth switch device SW15 may be referred to as a first driving switch device.

The second switch group SWB may include sixth to tenth switch devices SW21 to SW25.

Each of the sixth to tenth switch devices SW21 to SW25 may have one end connected to the second transmission touch line TX2, and the sixth to tenth switch devices SW21 to SW25 may have the other ends respectively connected to the first to fifth switch devices SW11 to SW15.

The sixth switch device SW21 has the other end connected to the ground. The sixth switch device SW21 may be referred to as a second ground switch device.

The seventh switch device SW22 has the other end connected to the control switch group SWC. The seventh switch device SW22 may be referred to as a second driving switch device.

The eighth switch device SW23 has the other end receiving the driving voltage VD. The eighth switch device SW23 may be referred to as a second intermediate switch device.

The ninth switch device SW24 has the other end connected to the control switch group SWC. The ninth switch device SW24 may be referred to as a second upper switch device.

The tenth switch device SW25 has the other end connected to the control switch group SWC. The tenth switch device SW25 may be referred to as a second driving switch device.

The first control group SWC may include first to fourth control switch devices SW31, SW32, SW44, and SW34, and a capacitor device CAP.

The first control switch device SW31 has one end receiving the driving voltage VD. The first control switch device SW31 has the other end connected to the other end of each of the second and seventh switch devices SW12 and SW22 and one electrode of the capacitor device CAP.

The second control switch device SW32 has one end connected to the ground and the other end connected to the other end of each of the second and seventh switch devices SW12 and SW22 and one electrode of the capacitor device CAP.

The third control switch device SW33 has one end receiving the driving voltage VD. The third control switch device SW33 has the other end connected to the other end of each of the fourth and ninth switch devices SW14 and SW24 and the other electrode of the capacitor device CAP.

The fourth control switch device SW34 has one end connected to the other end of each of the fourth and ninth switch devices SW14 and SW24 and the other electrode of the capacitor device CAP. The fourth control switch device SW34 has the other end connected to the other end of each of the fifth and tenth switch devices SW15 and SW25.

The capacitor device CAP may include one electrode connected to a third node N3 and the other electrode connected to a fourth node N4. A difference in voltage of the third node N3 and the fourth node N4 may be maintained at the driving voltage VD.

The capacitor device CAP has a capacitance greater than each of the first and second transmission touch lines TX1 and TX2 and the first and second load capacitors CL1 and CL2. The capacitor device CAP may be provided in the touch driving chip TIP of FIG. 2 and also be provided on the printed circuit board PCB.

Figure 5A:
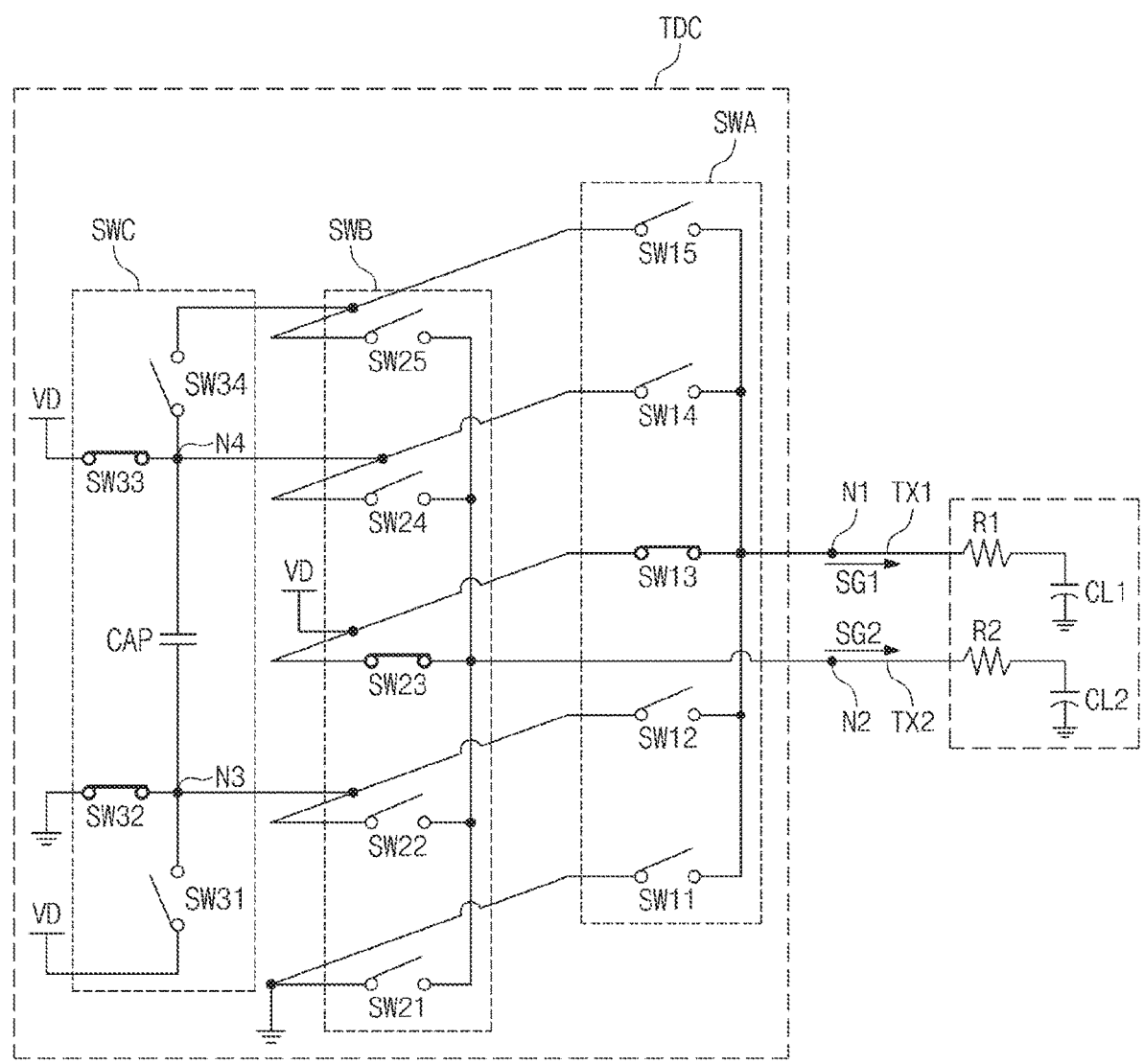
FIGS. 5A to 5H are views sequentially illustrating operation processes of the touch driving circuit of FIG. 4, which generates a touch driving signal having a plurality of voltage levels, according to an exemplary embodiment of the inventive concept.
Figure 5B:
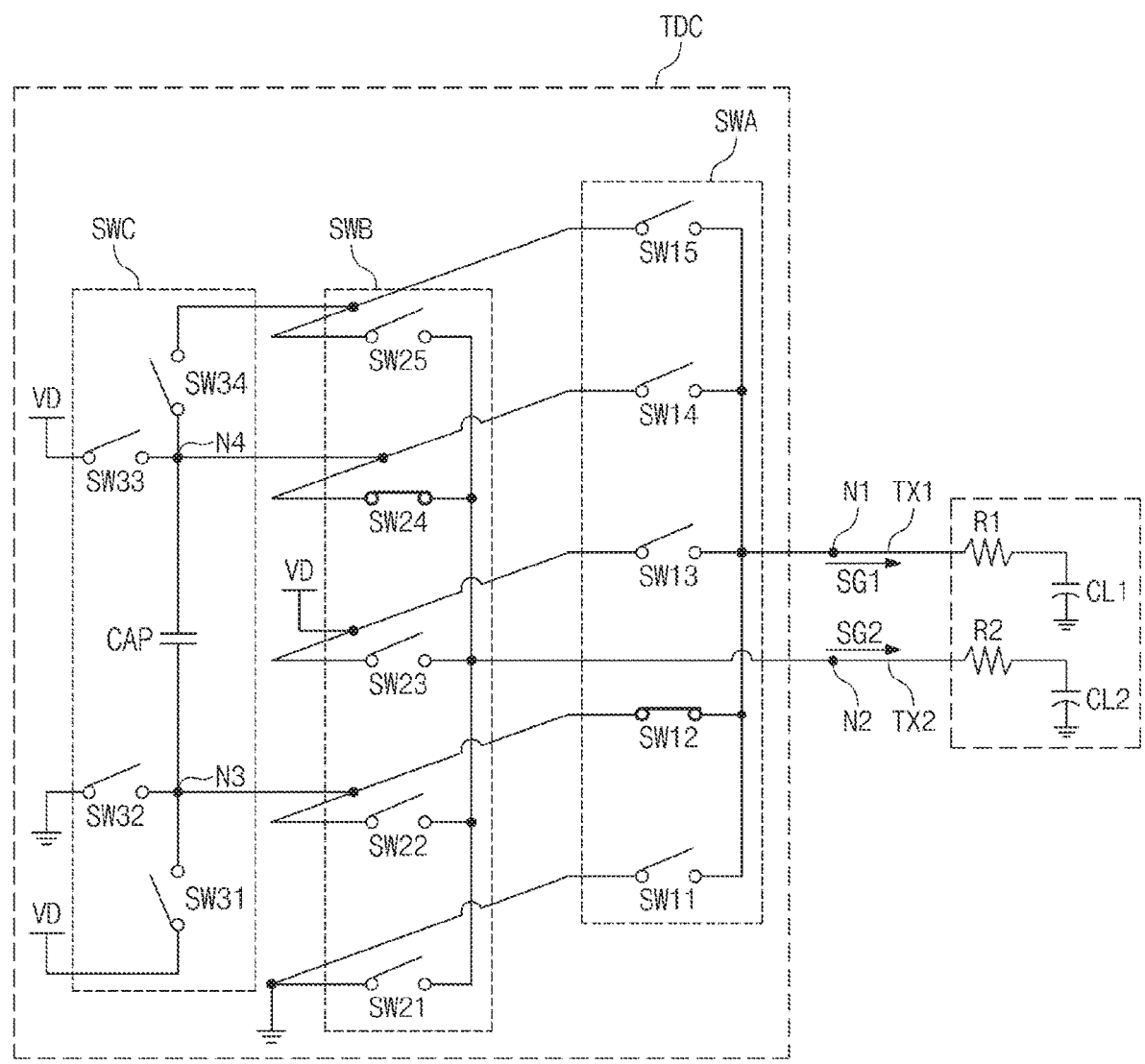
Figure 5C:
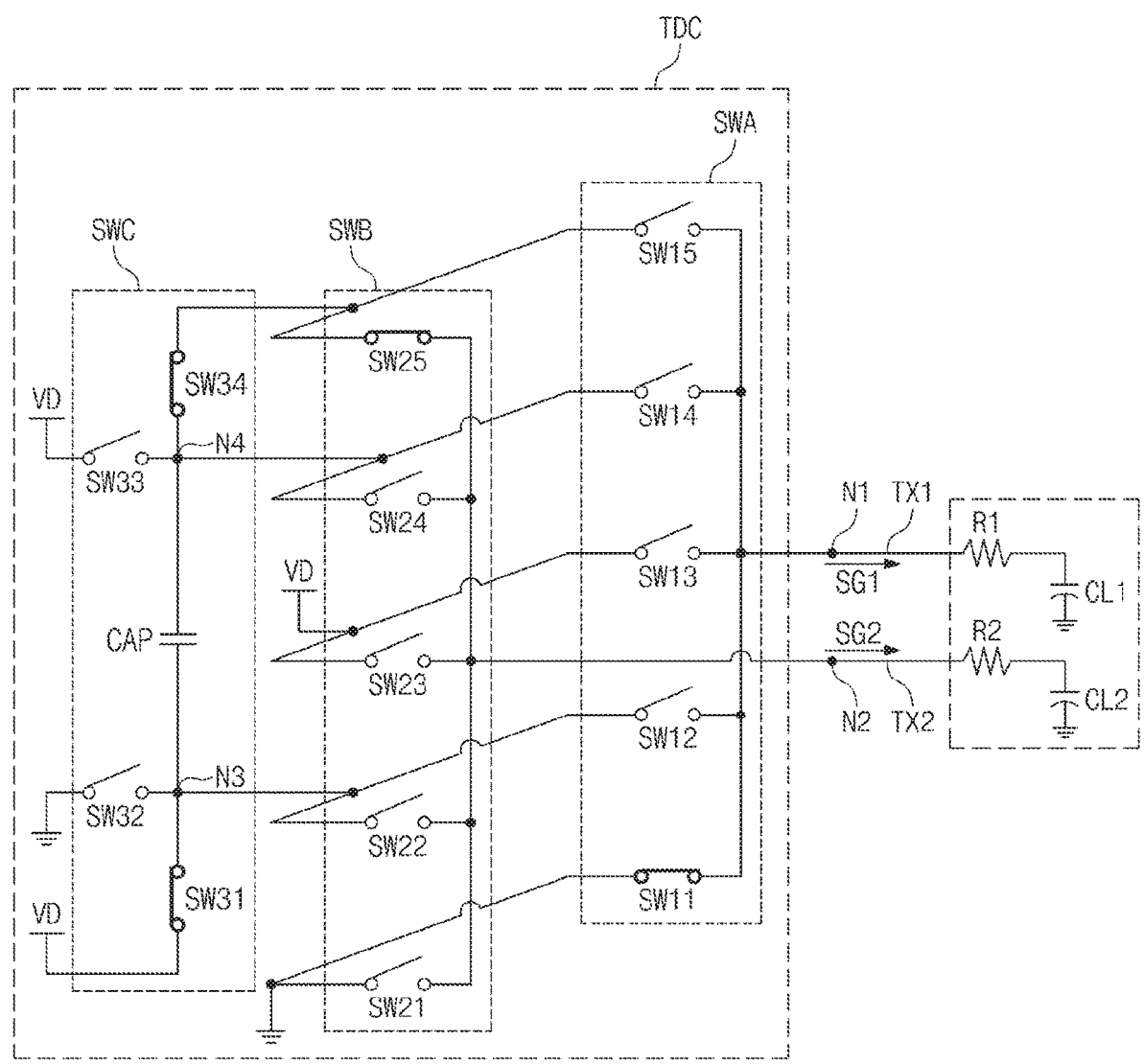
Figure 5D:
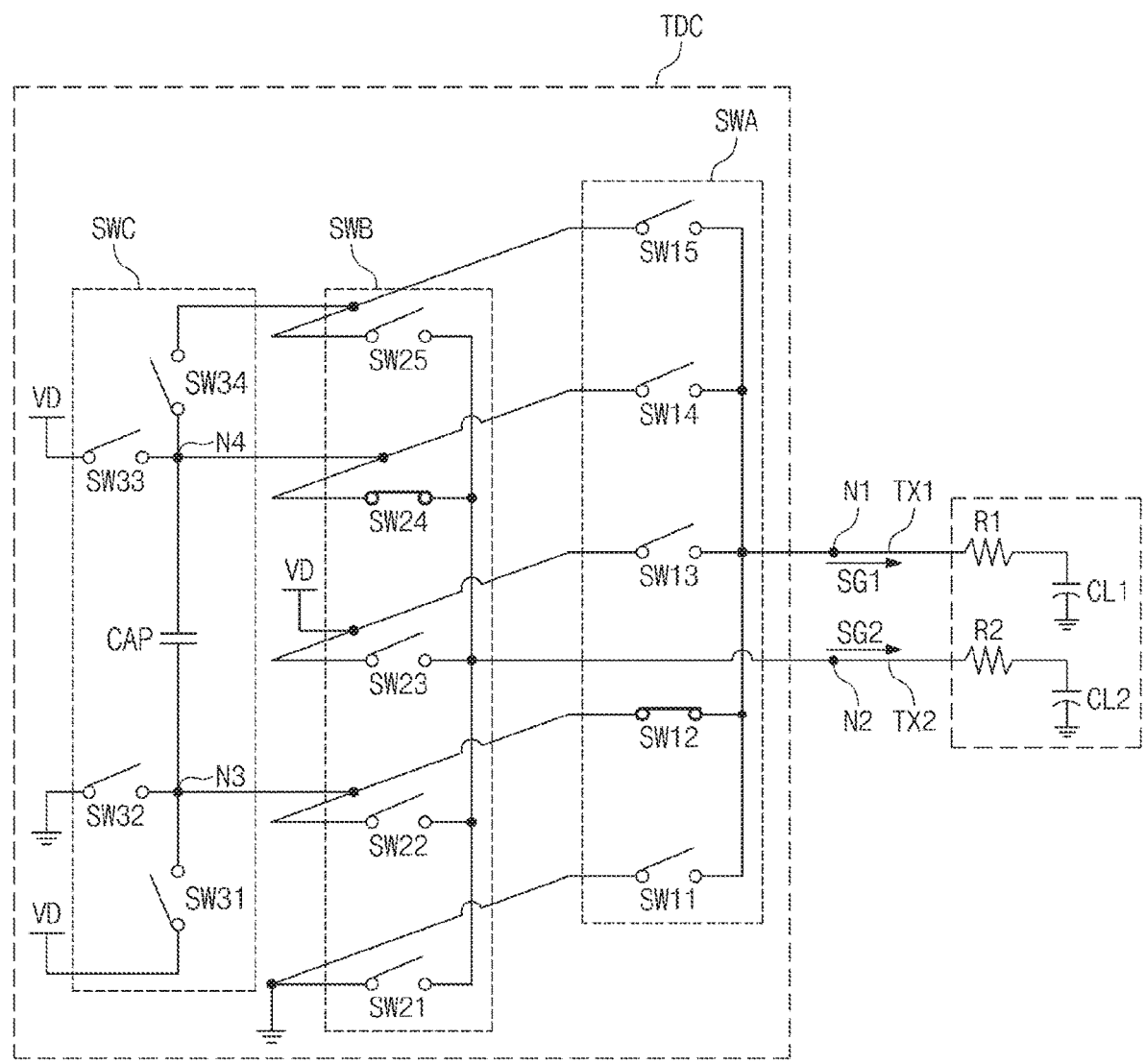
Figure 5E:
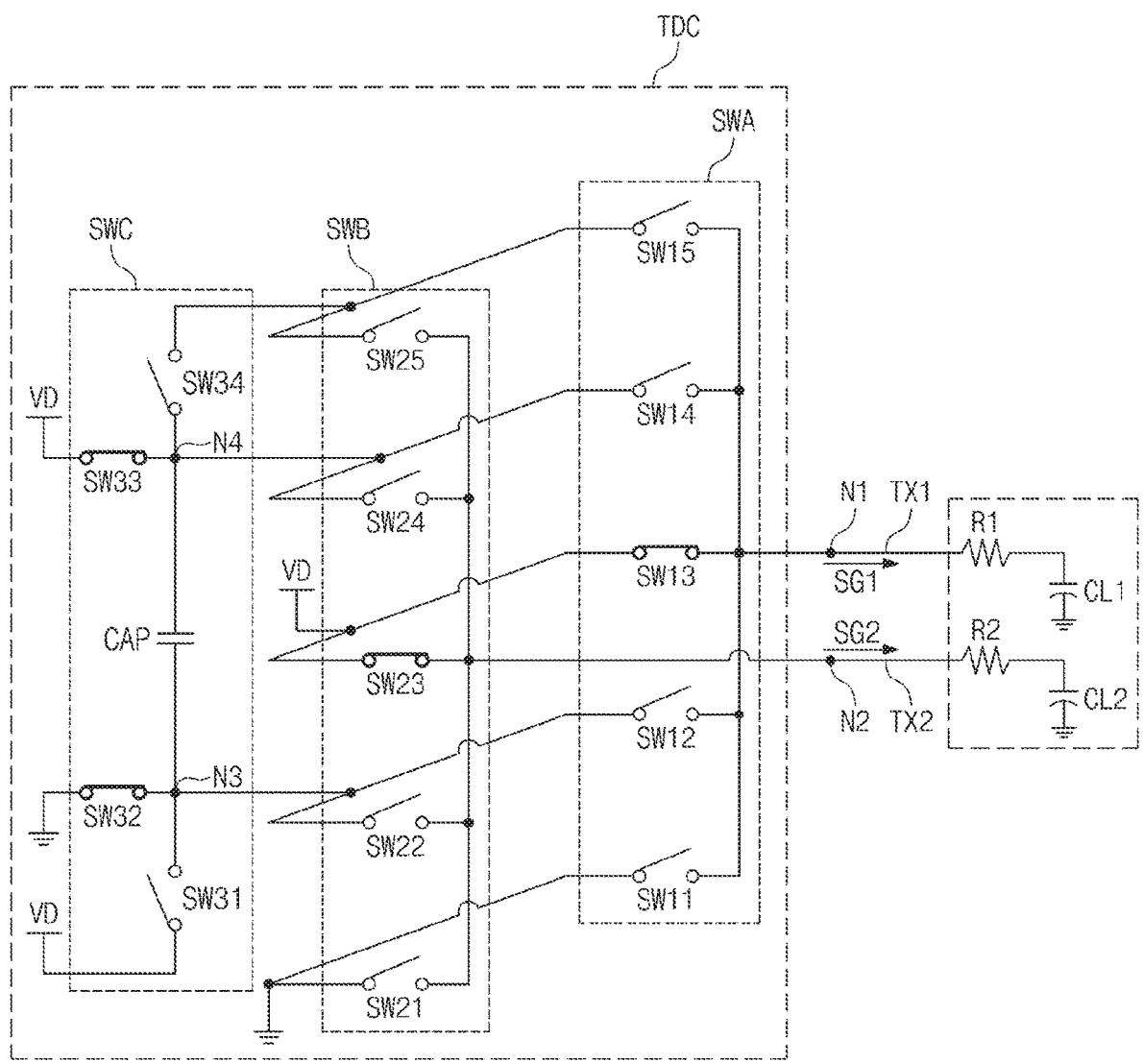
Figure 5F:
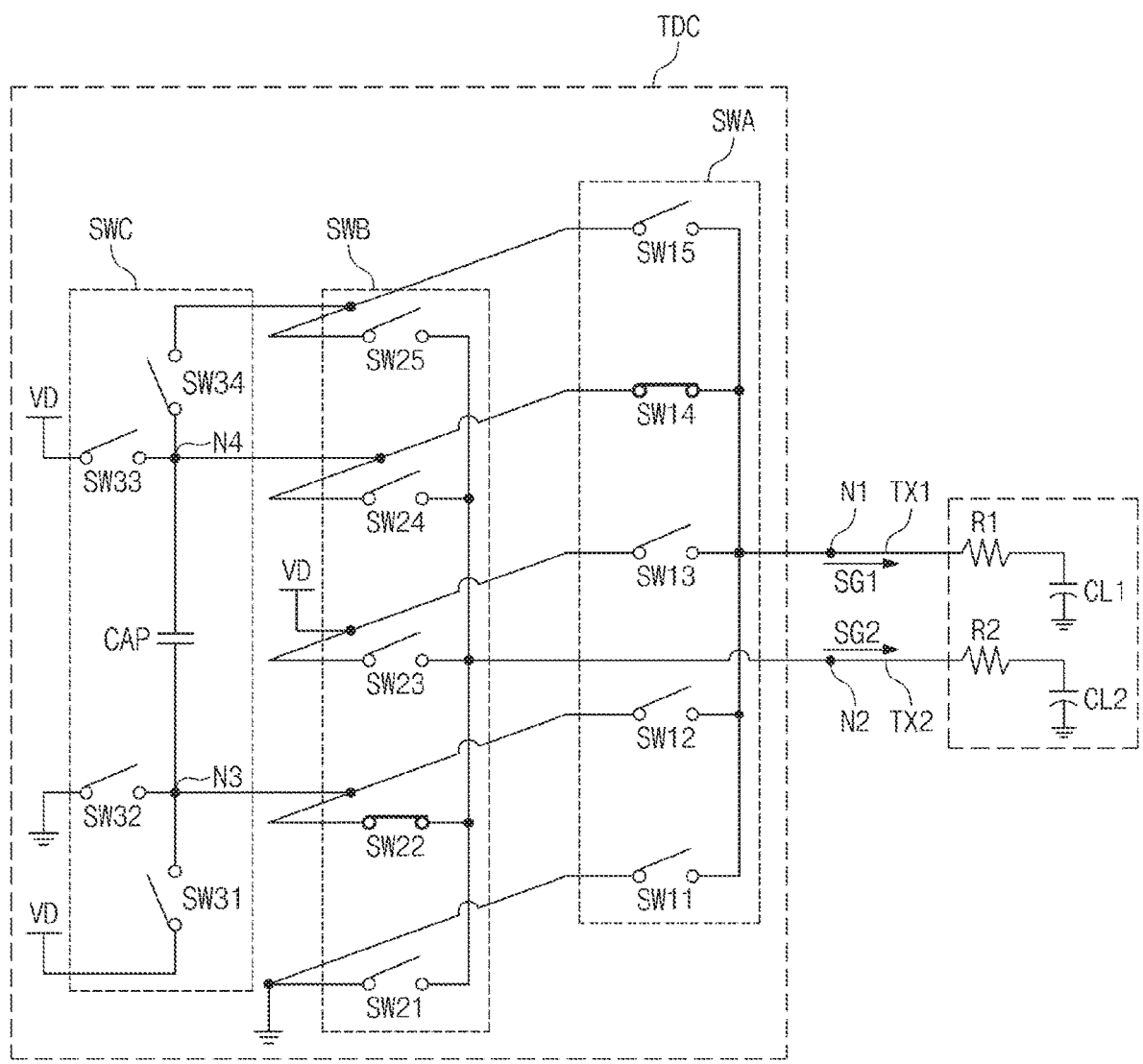
Figure 5G:
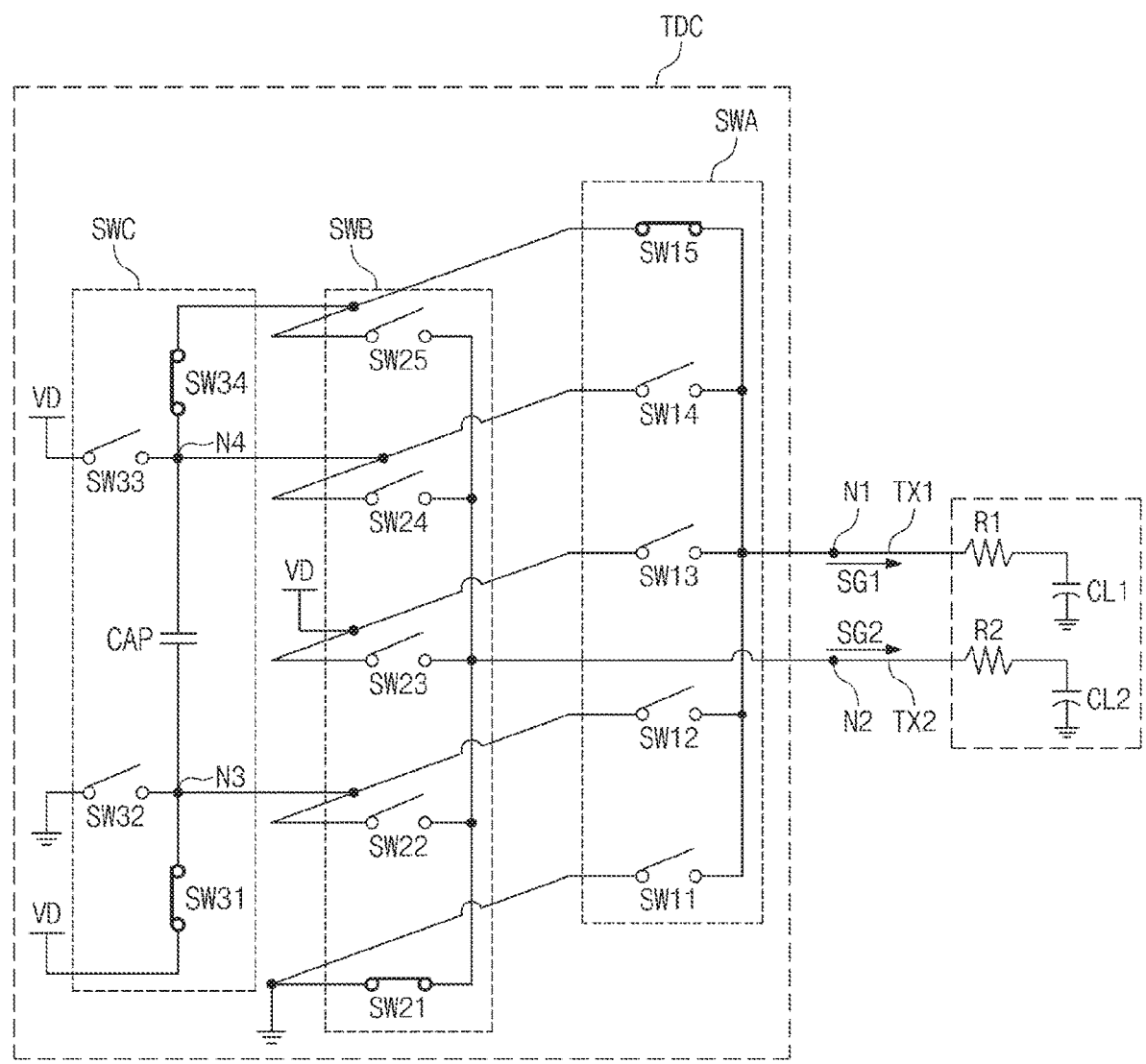
Figure 5H:
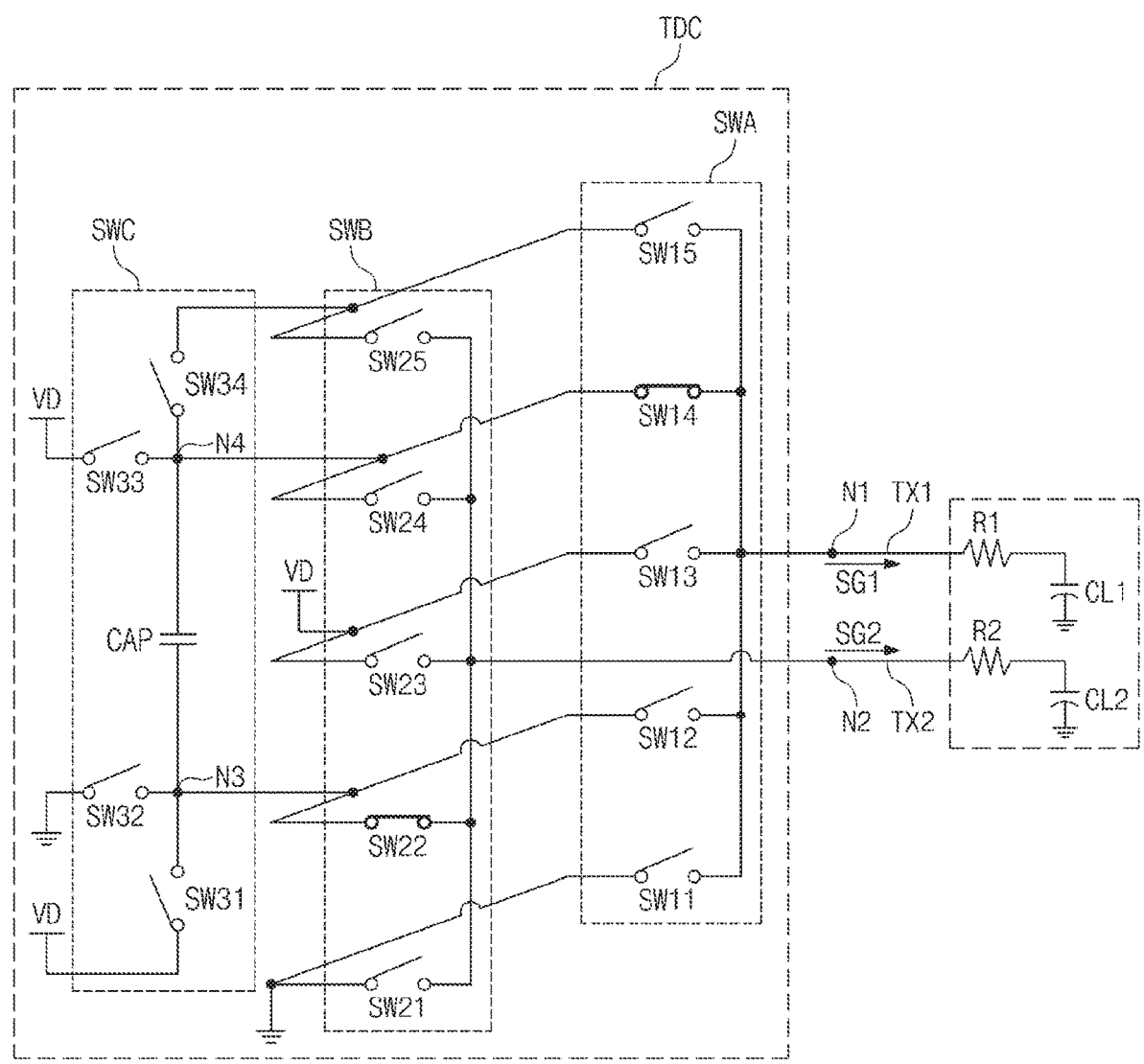
Figure 6:
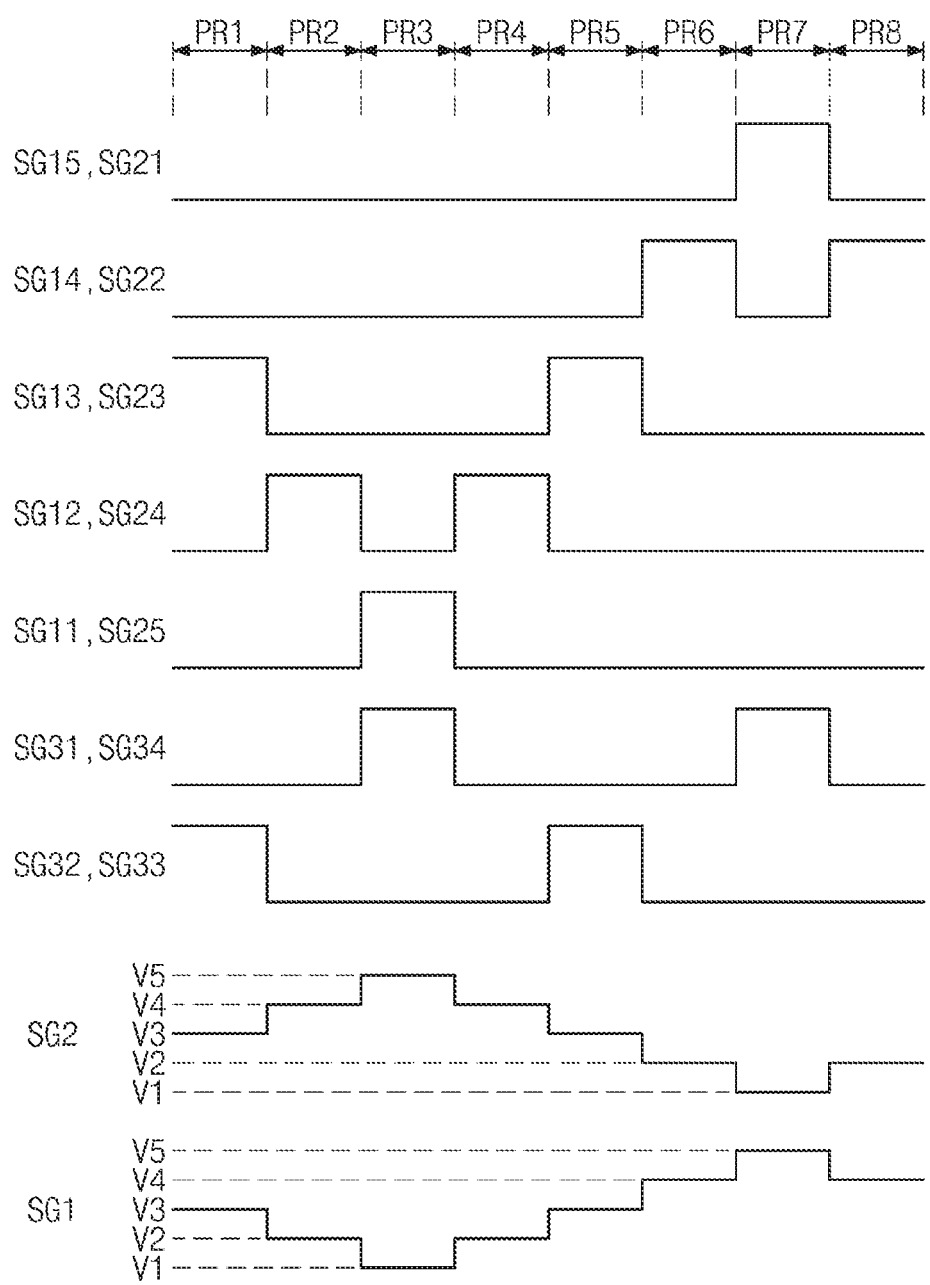
FIG. 6 is a waveform diagram illustrating switch signals, which are applied to first to tenth switch devices and first to fourth control switch devices, and the touch driving signal of FIGS. 5A to 5H according to an exemplary embodiment of the inventive concept.

FIGS. 5A to 5H are views sequentially illustrating operation processes of the touch driving circuit of FIG. 4, which generates a touch driving signal having a plurality of voltage levels according to an exemplary embodiment of the inventive concept, and FIG. 6 is a waveform diagram illustrating switch signals, which are applied to first to tenth switch devices and first to fourth control switch devices, and the touch driving signal of FIGS. 5A to 5H according to an exemplary embodiment of the inventive concept.

The switch signals include first to tenth switch signals SG11 to SG25 and first to fourth control switch signals SG31 to SG34. Each of the first to tenth switch signals SG11 to SG25 may be a signal that is applied to one of the first to tenth switch devices SW11 to SW25. Each of the first to fourth control switch signals SG31 to SG34 may be a signal that is applied to one of the first to fourth control switch devices SW31 to SW34.

According to an exemplary embodiment of the inventive concept, corresponding first to tenth switch devices SW11 to SW25 may be turned on during a period in which each of the first to tenth switch signals SG11 to SG25 has a high level, and corresponding first to tenth switch devices SW11 to SW25 may be turned off during a period in which each of the first to tenth switch signals SG11 to SG25 has a low level.

Similarly, corresponding first to fourth control switch devices SW31 to SW34 may be turned on during a period in which each of the first to fourth control switch signals SG31 to SG34 has a high level, and corresponding first to fourth control switch devices SW31 to SW34 may be turned off during a period in which each of the first to fourth control switch signals SG31 to SG34 has a low level.

According to an exemplary embodiment of the inventive concept, a case in which the touch driving circuit TDC generates the first touch driving signal SG1 to be provided to the first transmission touch line TX1 and also generates the second touch driving signal SG2 to be provided to the second transmission touch line TX2 will be exemplarily described. The first touch driving signal SG1 and the second touch driving signals SG2 may have different phases. Particularly, the first touch driving signal SG1 and the second touch driving signal SG2 may have phases that are opposite to each other.

The first and second touch driving signals SG1 and SG2 may be step-shaped signals that are repeatedly ascend and descend. According to an exemplary embodiment of the inventive concept, the first and second touch driving signals SG1 and SG2 may sequentially repeatedly ascend and descend from a first level V1 that is a voltage level of the ground to a fifth level V5 that is a voltage level of the driving voltage VD. For this, the first to fifth switch devices SW11, SW12, SW13, SW14, and SW15 may be turned on in sequence or in reverse order, and the sixth to tenth switch devices SW21, SW22, SW23, SW24, and SW25 may be turned on in sequence or in reverse order.

Referring to FIGS. 5A and 6, during a first period PR1, the third switch device SW13 is turned on by the third switch signal SG13, and the eighth switch device SW23 is turned on by the eighth switch signal SG23. During the first period PR1, the second control switch device SW32 is turned on by the second control switch signal SG32, and the third control switch device SW33 is turned on by the third control switch signal SG33.

During the first period PR1, the rest of the switch devices SW11, SW12, SW14, SW15, SW21, SW22, SW24, and SW25 and the first and fourth control switch devices SW31 and SW34 are turned off.

Since the first node N1 and the second node N2 receive the driving voltage, each of the first and second driving signals SG1 and SG2 may have a third level V3 that is the voltage level of the driving voltage VD during the first period PR1.

Since the second and third control switch devices SW32 and SW33 are turned on, a voltage between both electrodes of the capacitor device CAP may be charged as the driving voltage VD.

Referring to FIGS. 5B and 6, thereafter, during a second period PR2, the second switch device SW12 is turned on by the second switch signal SG12, and the ninth switch device SW24 is turned on by the ninth switch signal SG24. During the second period PR2, the rest of the switch devices SW11, SW13, SW14, SW15, SW21, SW22, SW23, and SW25 are turned off.

During the second period PR2, the first to fourth control switch devices SW31, SW32, SW33, and SW34 are turned off by the first to fourth control switch signals SG31, SG32, SG33, and SG34.

Since the capacitor device CAP has a characteristic of maintaining the voltage between both of its electrodes, a voltage level of the first touch driving signal SG1 connected to the third node N3 reaches a second level V2 having a voltage level having a value of VD/2, and a voltage level of the second touch driving signal SG2 connected to the fourth node N4 reaches a fourth level V4 having a voltage level having a value of 3/2·VD.

The capacitor device CAP may have a capacitance that is set to be greater by at least several ten times to several hundred times than that of each of the first load capacitor CL1 and the second load capacitor CL2. Thus, even though charges move between the capacitor device CAP and the first and second load capacitors CL1 and CL2, a variation in voltage level between the third node N3 and the fourth node N4 may be very small and thus be ignored.

Referring to FIGS. 5C and 6, thereafter, during a third period PR3, the first switch device SW11 is turned on by the first switch signal SG11, and the tenth switch device SW25 is turned on by the tenth switch signal SG25. During the third period PR3, the first control switch device SW32 is turned on by the first control switch signal SG31, and the fourth control switch device SW34 is turned on by the fourth control switch signal SG34. During the third period PR3, the rest of the switch devices SW12, SW13, SW14, SW15, SW21, SW22, SW23, and SW24 and the first and third control switch devices SW32 and SW33 are turned off.

During the third period PR3, the voltage level of the first touch driving signal SG1 reaches the first level V1 by the ground. Since a voltage between both of the electrodes of the capacitor device CAP is maintained to the driving voltage VD, and one electrode of the capacitor device CAP receives the driving voltage VD, the voltage level of the second touch driving signal SG2 reaches the fifth level V5 having a value of 2·VD during the third period PR3.

Referring to FIGS. 5D and 6, thereafter, during a fourth period PR4, the second switch device SW12 is turned on by the second switch signal SG12, and the ninth switch device SW24 is turned on by the ninth switch signal SG24. During the fourth period PR4, the rest of the switch devices SW11, SW13, SW14, SW15, SW21, SW22, SW23, and SW25 are turned off. During the fourth period PR4, the first to fourth control switch devices SW31, SW32, SW33, and SW34 are turned off by the first to fourth control switch signals SG31, SG32, SG33, and SG34.

Since the capacitor device CAP has a characteristic of maintaining the voltage between both of its electrodes, a voltage level of the first touch driving signal SG1 connected to the third node N3 reaches the second level V2 having the voltage level having a VD/2 value, and a voltage level of the second touch driving signal GS2 connected to the fourth node N4 reaches the fourth level V4 having a voltage level having the 3/2·VD value.

The capacitor device CAP may have a capacitance that is set to be greater by at least several ten times to several hundred times than that of each of the first load capacitor CL1 and the second load capacitor CL2. Thus, even though charges move between the capacitor device CAP and the first and second load capacitors CL1 and CL2, a variation in voltage level between the third node N3 and the fourth node N4 may be very small and thus be ignored.

Referring to FIGS. 5E and 6, thereafter, during a fifth period PR5, the third switch device SW13 is turned on by the third switch signal SG13, and the eighth switch device SW23 is turned on by the eighth switch signal SG23. During the fifth period PR5, the second control switch device SW32 is turned on by the second control switch signal SG32, and the third control switch device SW33 is turned on by the third control switch signal SG33.

During the fifth period PR5, the rest of the switch devices SW11, SW12, SW14, SW15, SW21, SW22, SW24, and SW25 and the first and fourth control switch devices SW31 and SW34 are turned off.

Since the first node N1 and the second node N2 receive the driving voltage, each of the first and second driving signals SG1 and SG2 may have the third level V3 that is the voltage level of the driving voltage VD during the fifth period PR5.

Since the second and third control switch devices SW32 and SW33 are turned on, a voltage between both electrodes of the capacitor device CAP may be charged as the driving voltage VD.

Referring to FIGS. 5F and 6, thereafter, during a sixth period PR6, the fourth switch device SW14 is turned on by the fourth switch signal SG14, and the seventh switch device SW27 is turned on by the seventh switch signal SG27. During the sixth period PR6, the rest of the switch devices SW11, SW12, SW13, SW15, SW21, SW23, SW24, and SW25 are turned off. During the sixth period PR6, the first to fourth control switch devices SW31, SW32, SW33, and SW34 are turned off by the first to fourth control switch signals SG31, SG32, SG33, and SG34.

Since the capacitor device CAP has a characteristic of maintaining the voltage between both of its electrodes, a voltage level of the second touch driving signal SG2 connected to the third node N3 reaches the second level V2 having the voltage level having the value of VD/2, and a voltage level of the first touch driving signal SG1 connected to the fourth node N4 reaches the fourth level V4 having the voltage level having the value of 3/2·VD.

The capacitor device CAP may have a capacitance that is set to be greater by at least several ten times to several hundred times than that of each of the first load capacitor CL1 and the second load capacitor CL2. Thus, even though charges move between the capacitor device CAP and the first and second load capacitors CL1 and CL2, a variation in voltage level between the third node N3 and the fourth node N4 may be very small and thus be ignored.

Referring to FIGS. 5G and 6, thereafter, during a seventh period PR7, the fifth switch device SW15 is turned on by the fifth switch signal SG26, and the sixth switch device SW26 is turned on by the sixth switch signal SG26. During the seventh period PR7, the first control switch device SW31 is turned on by the first control switch signal SG31, and the fourth control switch device SW34 is turned on by the fourth control switch signal SG34. During the seventh period PR7, the rest of the switch devices SW12, SW13, SW14, SW15, SW21, SW22, SW23, and SW24 and the second and third control switch devices SW32 and SW33 are turned off.

During the seventh period PR7, the voltage level of the second touch driving signal SG2 reaches the first level V1 by the ground. Since a voltage between both the electrodes of the capacitor device CAP is maintained to the voltage VD, and one electrode of the capacitor device CAP receives the driving voltage VD, the voltage level of the first touch driving signal SG1 reaches the fifth level V5 having the value of 2·VD during the seventh period PR7.

Referring to FIGS. 5H and 6, thereafter, during an eighth period PR8, the fourth switch device SW14 is turned on by the fourth switch signal SG14, and the seventh switch device SW27 is turned on by the seventh switch signal SG27. During the eighth period PR8, the rest switch devices SW11, SW12, SW13, SW15, SW21, SW23, SW24, and SW25 are turned off. During the eighth period PR8, the first to fourth control switch devices SW31, SW32, SW33, and SW34 are turned off by the first to fourth control switch signals SG31, SG32, SG33, and SG34.

Since the capacitor device CAP has a characteristic of maintaining the voltage between both of its electrodes, a voltage level of the second touch driving signal SG2 connected to the third node N3 reaches the second level V2 having the voltage level having the value of VD/2, and a voltage level of the first touch driving signal SG1 connected to the fourth node N4 reaches the fourth level V4 having the voltage level having the value of 3/2·VD.

The capacitor device CAP may have a capacitance that is set to be greater by at least several ten times to several hundred times than that of each of the first load capacitor CL1 and the second load capacitor CL2. Thus, even though charges move between the capacitor device CAP and the first and second load capacitors CL1 and CL2, a variation in voltage level between the third node N3 and the fourth node N4 may be very small and thus be ignored.

The processes of FIGS. 5A to 5H may be sequentially performed to allow the touch driving circuit TDC to generate the first and second touch driving signals corresponding to one period.

Although the first touch driving signal SG1 and the second touch driving signals SG2 have phases opposite to each other as described above, the inventive concept is not limited thereto. Since the first switch group SWA and the second switch group SWB are independently controlled, the first touch driving signal SG1 and the second touch driving signal SG2 may have the same phase or have phases opposite to each other.

When the touch driving circuit TDC does not include the control switch devices SW31, SW32, SW33, and SW34, at least N−3 or more capacitor devices may be required to generate a touch driving signal having N voltage levels. In the display apparatus according to an exemplary embodiment of the inventive concept, since the touch driving circuit TDC includes the control switch devices SW31, SW32, SW33, and SW34, N−4 capacitor devices (e.g., one capacitor device in an exemplary embodiment of the inventive concept) are required to generate a touch driving signal having N voltage levels (the first to fifth levels V1 to V5 in an exemplary embodiment of the inventive concept). Here, N may be a natural number of 5 or more.

Since the capacitor device CAP has a relatively large capacitance, a degree of freedom in design is limited due to a large surface area, and thus, the manufacturing cost increases. In the display apparatus according to an exemplary embodiment of the inventive concept, the number of capacitor devices may decrease to reduce the manufacturing cost and improve the degree of freedom in design.

Figure 7A:
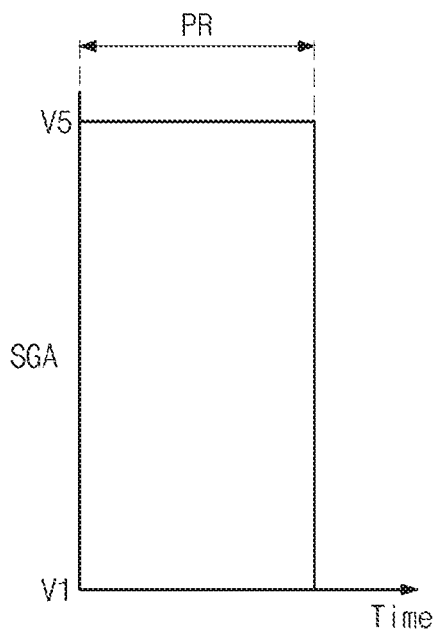
FIG. 7A is a view illustrating a waveform of a touch driving signal during a reference period according to a comparative example.
Figure 7B:
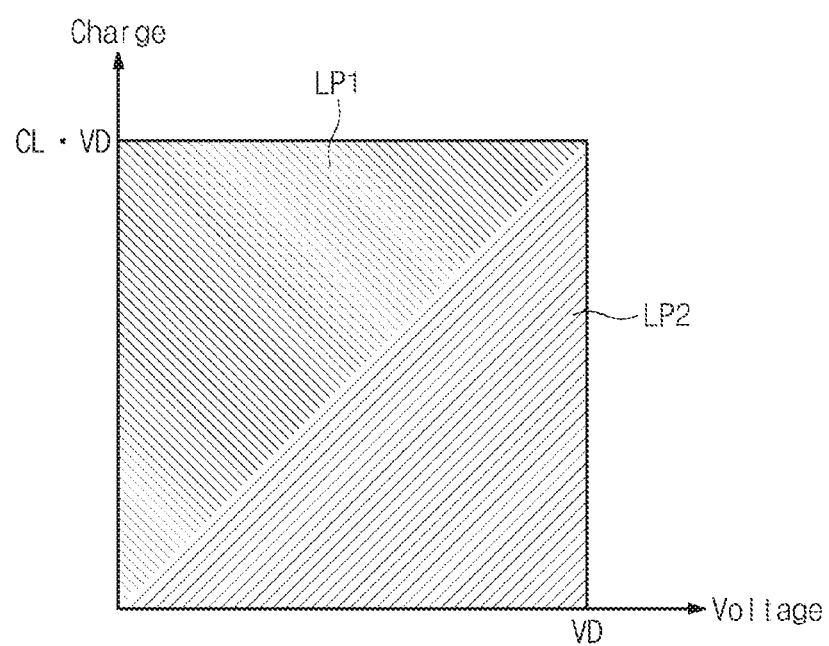
FIG. 7B is a conceptual view illustrating an amount of charge loss of a transmission touch line and an amount of charges charged to a load capacitor by the touch driving signal of FIG. 7A according to a comparative example.
Figure 7C:
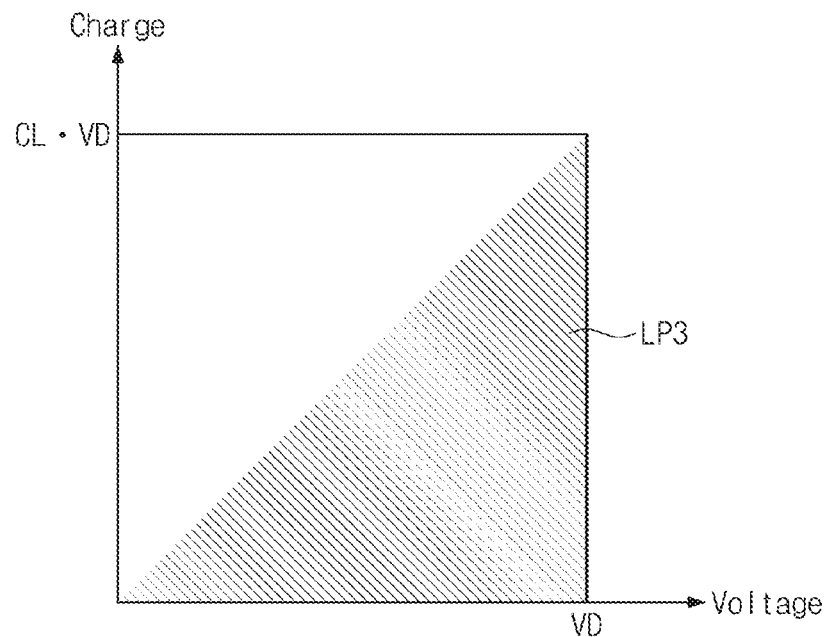
FIG. 7C is a conceptual view illustrating an amount of charges discharged from the load capacitor by the touch driving signal of FIG. 7A according to a comparative example.
Figure 7D:
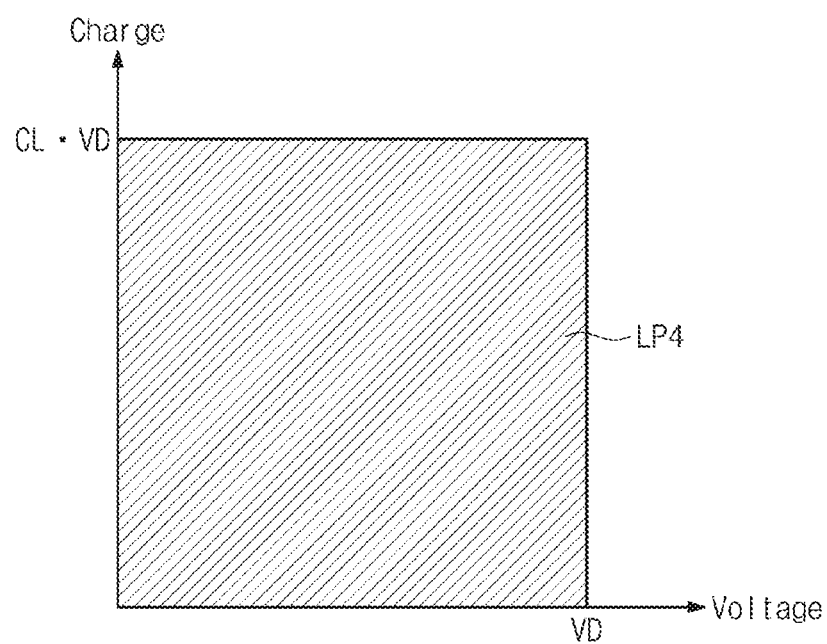
FIG. 7D is a conceptual view illustrating the sum of the amount of charge loss of the transmission touch line and the amount of charges discharged from the load capacitor by the touch driving signal of FIG. 7A according to a comparative example.

FIG. 7A is a view illustrating a waveform of a touch driving signal during a reference period according to a comparative example, FIG. 7B is a conceptual view illustrating an amount of charge loss of a transmission touch line and an amount of charges charged to a load capacitor by the touch driving signal of FIG. 7A according to a comparative example, FIG. 7C is a conceptual view illustrating an amount of charges discharged from the load capacitor by the touch driving signal of FIG. 7A according to a comparative example, and FIG. 7D is a conceptual view illustrating the sum of the amount of charge loss of the transmission touch line and the amount of charges discharged from the load capacitor by the touch driving signal of FIG. 7A according to a comparative example.

The touch driving circuit according to the comparative example may not include the switch group and the control switch device but provide a square-wave voltage signal having the highest level of the driving voltage as a touch driving signal SGA as illustrated in FIG. 7A. In FIG. 7A, it is assumed that a first level V1 and a fifth level V5 are the same as the first level V1 and the fifth level V5 of FIG. 6. Additionally, it is assumed that a reference period PR is substantially the same as the fourth to seventh periods PR4 to PR7.

Referring to FIGS. 7A and 7B, during the reference period PR, the touch driving signal SGA may have the fifth level V5 that is the voltage level of the driving voltage VD to provide charges corresponding to a value of CL·VD. CL represents a capacitance of the load capacitor. Thus, the transmission touch line according to the comparative example may consume energy corresponding to the value of CL·VD. Only energy LP2 corresponding to a value of CL·VD$^2$/2 may be stored in the load capacitor, and energy LP1 corresponding to the remaining value of CL·VD$^2$/2 may be lost by line resistance of the transmission touch line.

Referring to FIGS. 7A and 7C, during the reference period PR, energy LP3 corresponding to the value of CL·VD2/2 stored in the load capacitor may be discharged through the ground after the reference period PR.

Referring to FIGS. 7A and 7D, total energy LP4 lost by applying the touch driving signal having the highest level of the driving voltage VD during the reference period PR to the transmission touch line may correspond to the value of CL·VD$^2$.

Figure 8A:
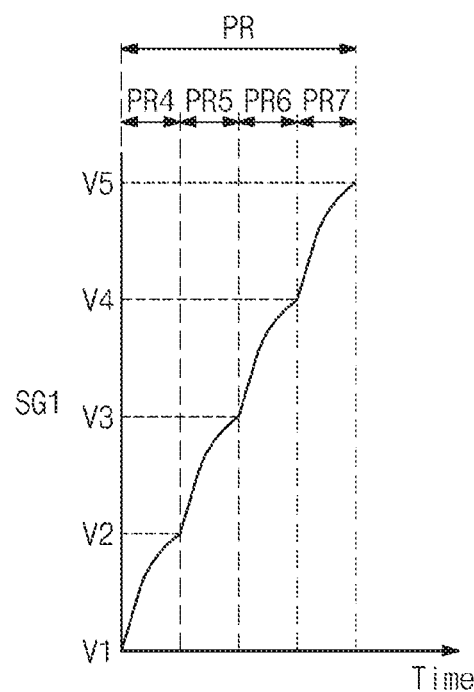
FIG. 8A is a view illustrating a waveform of a touch driving signal during a reference period according to an exemplary embodiment of the inventive concept.
Figure 8B:
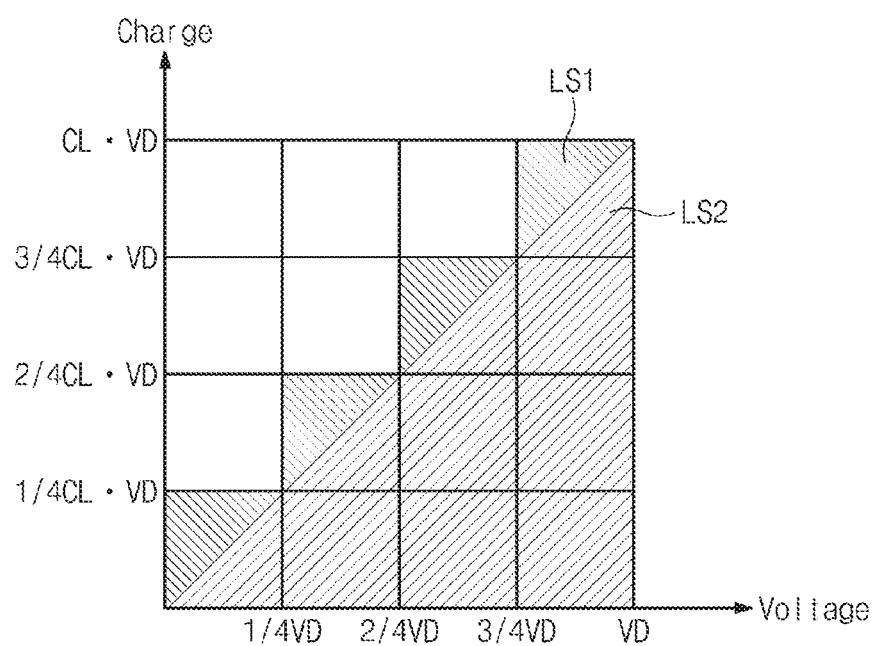
FIG. 8B is a conceptual view illustrating an amount of charge loss of a transmission touch line and an amount of charges charged to a load capacitor by the touch driving signal of FIG. 8A according to an exemplary embodiment of the inventive concept.
Figure 8C:
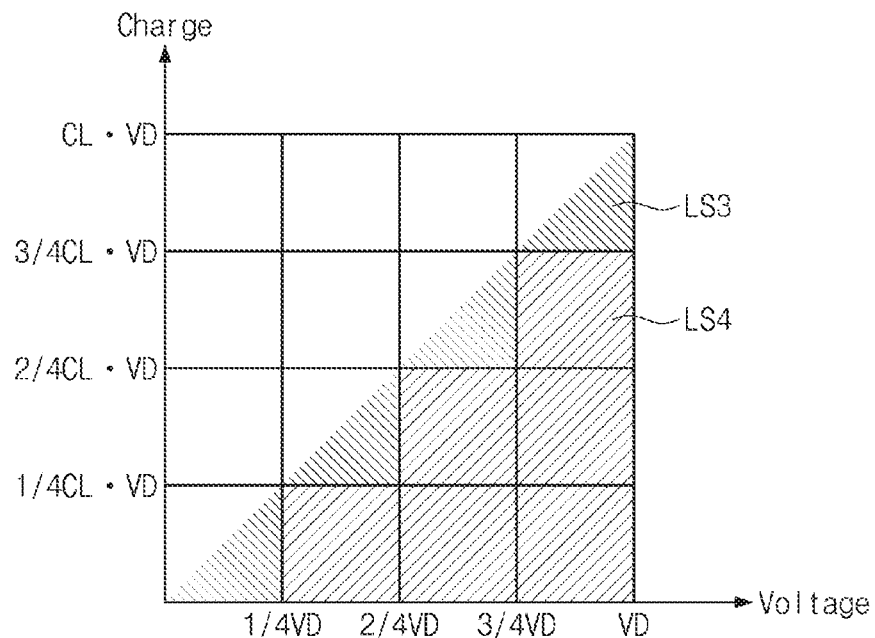
FIG. 8C is a conceptual view illustrating an amount of charges discharged from the load capacitor by the touch driving signal of FIG. 8A according to an exemplary embodiment of the inventive concept.
Figure 8D:
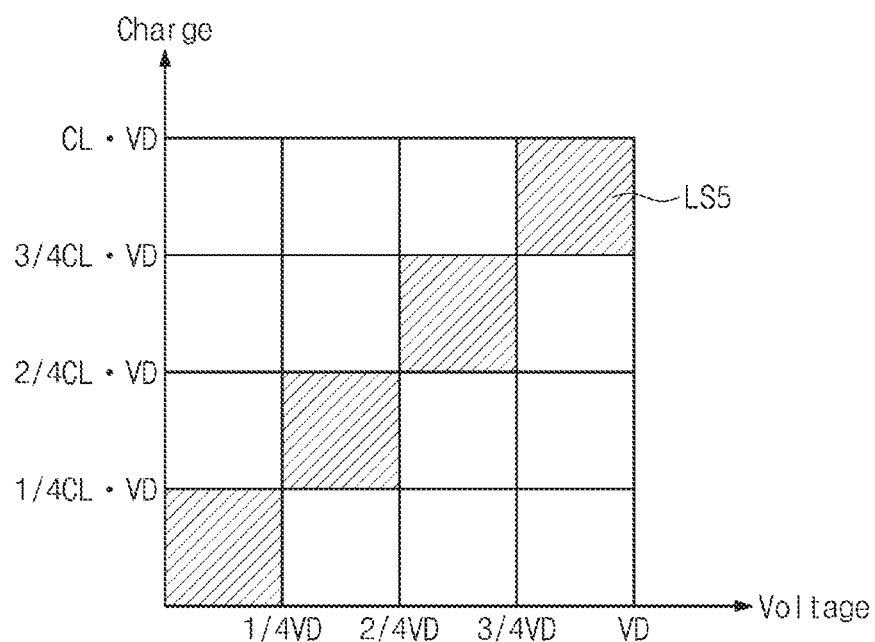
FIG. 8D is a conceptual view illustrating the sum of the amount of charge loss of the transmission touch line and the amount of charges discharged from the load capacitor by the touch driving signal of FIG. 8A according to an exemplary embodiment of the inventive concept.

FIG. 8A is a view illustrating a waveform of a touch driving signal during a reference period according to an exemplary embodiment of the inventive concept, FIG. 8B is a conceptual view illustrating an amount of charge loss of a transmission touch line and an amount of charges charged to a load capacitor by the touch driving signal of FIG. 8A according to an exemplary embodiment of the inventive concept, FIG. 8C is a conceptual view illustrating an amount of charges discharged from the load capacitor by the touch driving signal of FIG. 8A according to an exemplary embodiment of the inventive concept, and FIG. 8D is a conceptual view illustrating the sum of the amount of charge loss of the transmission touch line and the amount of charges discharged from the load capacitor by the touch driving signal of FIG. 8A according to an exemplary embodiment of the inventive concept.

A first touch driving signal SG1 during the reference period PR of FIG. 8A may have substantially the same waveform as the first touch driving signal SG1 during the fourth to seventh periods PR4 to PR7 of FIG. 6. In FIGS. 8B to 8D, a reference symbol CL represents a capacitance of the first load capacitor CL1. In FIG. 8A, the first touch driving signal SG1 may represent an analog voltage waveform, and a portion of the first touch driving signal SG1 may be delayed.

Referring to FIGS. 4, 6, 8A, and 8B, during the fourth period PR4, since the first touch driving signal SG1 has a voltage level of VD/4 (the second level V2), and charges corresponding to a value of CL·VD/4 are provided, a first transmission touch line TX1 consumes energy corresponding to a value of $CL \cdot VD^2/16$. Among them, only the energy corresponding to the value of $CL \cdot VD^2/32$ is stored, and energy corresponding to the remaining value of $CL \cdot VD^2/32$ is lost by the line resistance of the first transmission touch line TX1. Similarly, during the fifth to seventh periods PR5 to PR7, only the energy corresponding to the value of $CL \cdot VD^2/32$ is stored, and energy corresponding to the remaining value of $CL \cdot VD^2/32$ is lost by the line resistance of the first transmission touch line TX1. In FIG. 8B, an energy LS1 (e.g., an amount of charges) lost by the first transmission touch line TX1 may be a value of $CL \cdot VD^2/8$, and energy LS2 stored in the second load capacitor CL2 may be a value of $CL \cdot VD^2/2$.

Referring to FIGS. 4, 6, 8A, and 8C, during the fourth period PR4, the energy corresponding to the value of $CL \cdot VD^2/32$ stored in the first load capacitor CL2 may be discharged through the ground. Similarly, during each of the fifth to seventh periods PR5 to PR7, the energy corresponding to the value of $CL \cdot VD^2/32$ may be discharged. During the fifth period PR5, the energy corresponding to the value of $CL \cdot VD^2/16$ may be recycled through the capacitor device CAP. During the fifth to seventh periods PR5 to PR7, the energy corresponding to a value of $6CL \cdot VD^2/16$ may be recycled through the capacitor device CAP. In FIG. 8C, energy LS3 discharged from the first load capacitor CL1 may be the value of $CL \cdot VD^2/8$, and energy LS4 that is recycled through the capacitor device CAP may be the value of $6CL \cdot VD^2/16$.

Referring to FIGS. 4, 6, 8A, and 8D, during each of the fourth to seventh periods PR4 to PR7, since the first touch driving signal SG1 that increases by a value of VD/4 is applied, the lost energy may be substantially the same as the sum of the amount of charges lost by the first transmission touch line TX1 and the amount of charges discharged from the first load capacitor CL1, e.g., the value of $CL \cdot VD^2/16$. During the reference period PR, total energy LS5 lost by applying the first touch driving signal SG1 to the first transmission touch line TX1 may correspond to a value of $CL \cdot VD^2/4$.

Thus, in the display apparatus including the touch driving circuit according to an exemplary embodiment of the inventive concept, the energy consumption may be reduced to about ¼ when compared to the display apparatus including the touch driving circuit according to the comparative example, which is described with reference to FIGS. 7A to 7D.

Figure 9A:
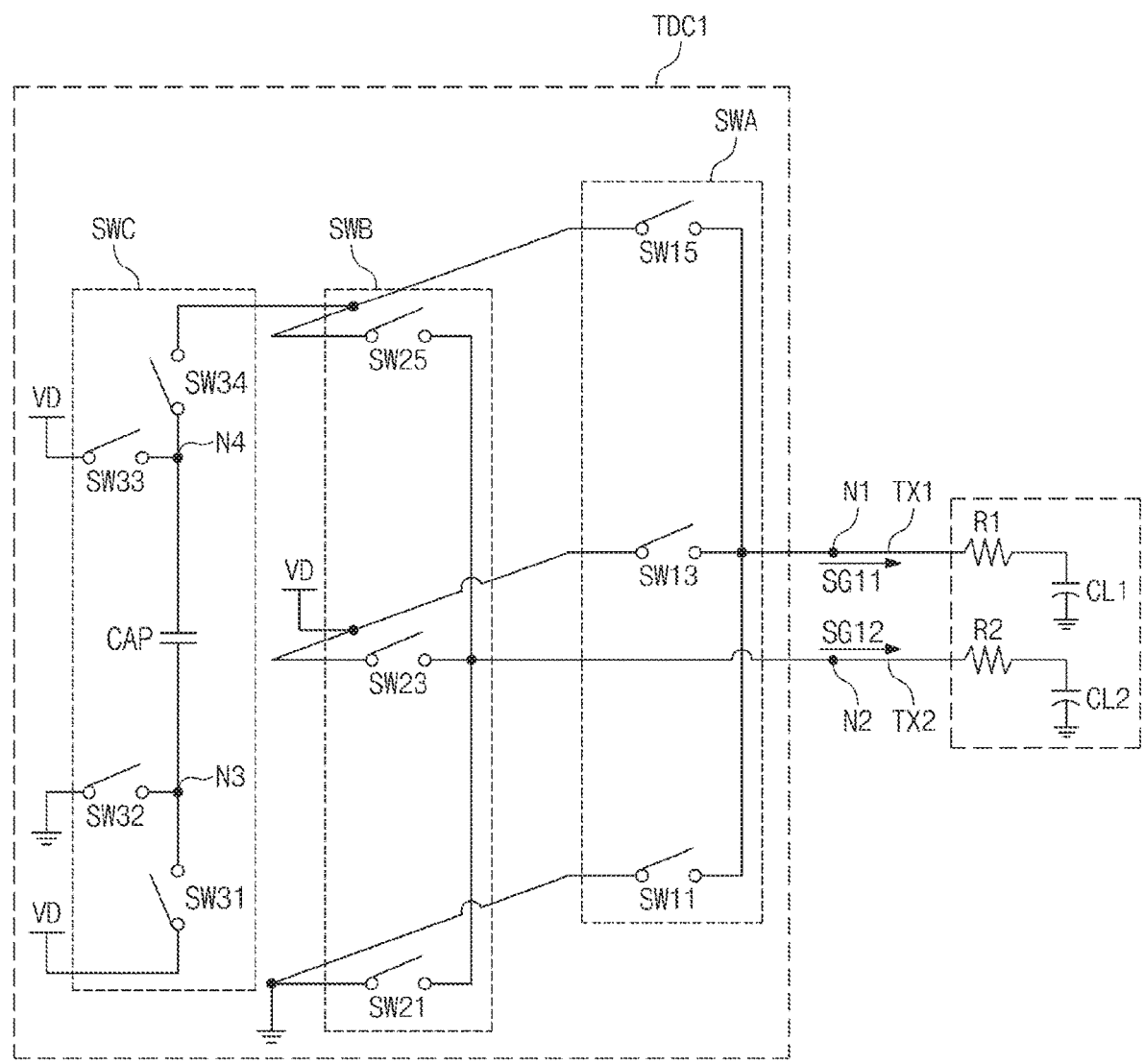
FIG. 9A is a circuit diagram of a touch driving circuit and transmission touch lines according to an exemplary embodiment of the inventive concept.
Figure 9B:
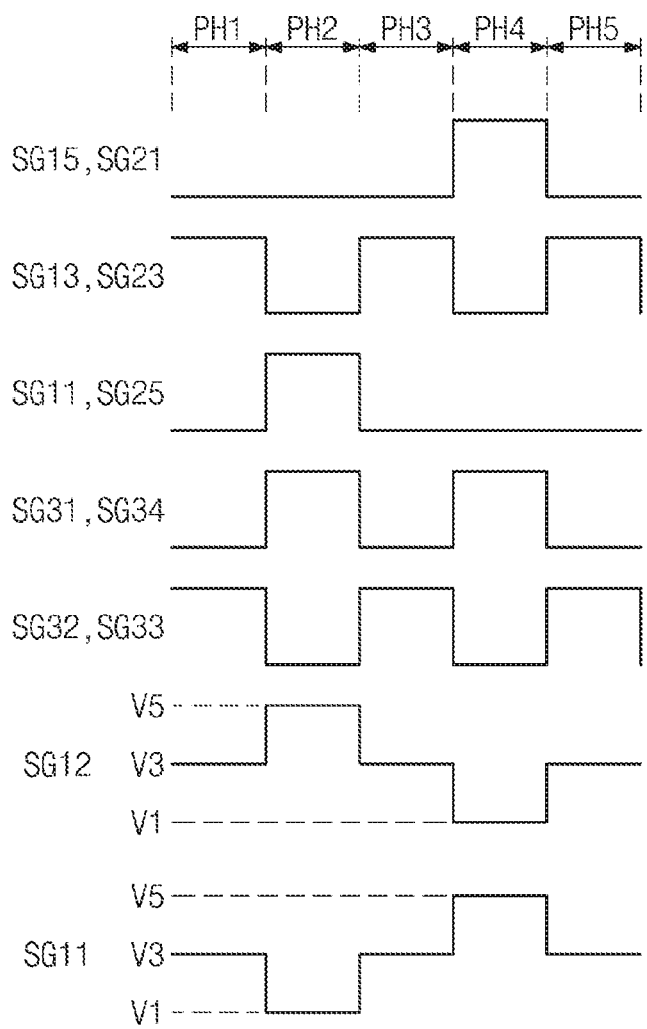
FIG. 9B is a waveform diagram of switch signals and a touch driving signal, which are applied to the touch driving circuit of FIG. 9A, according to an exemplary embodiment of the inventive concept

FIG. 9A is a circuit diagram of a touch driving circuit and transmission touch lines according to an exemplary embodiment of the inventive concept, and FIG. 9B is a waveform diagram of switch signals and a touch driving signal, which are applied to the touch driving circuit of FIG. 9A, according to an exemplary embodiment of the inventive concept.

A touch driving circuit TDC1 of FIG. 9A is different from the touch driving circuit TDC described with reference to FIG. 4 in that the second and fourth switch devices SW12 and SW14 are removed from the first switch group SWA, and the seventh and ninth switch devices SW22 and SW24 are removed from the second switch group SWB.

The touch driving circuit TDC1 of FIG. 9A may generate a touch driving signal having three voltage levels. In FIG. 9B, first and second touch driving signals SG11 and SG12 may have a first level that is a ground level, a third level that is a level of the driving voltage VD, and a fifth level having a value of 2·VD.

An operation relationship between the switch devices SW11, SW13, SW15,

SW21, SW23, and SW25 and the first to fourth control switch devices SW31, SW32, SW33, and SW34 through the switch signals SG11, SG13, SG15, SG21, SG23, and SG25 and the first to fourth control switch signals SG31, SG32, SG33, and SG34 has been described with reference to FIGS. 4 and 5, and thus, their detailed descriptions will be omitted.

The touch driving circuit TDC1 may successively perform the processes of first to fifth periods PH1 to PH5 to generate first and second touch driving signals SG11 and SG12 corresponding to one period.

However, the inventive concept is not limited thereto. For example, the switch signals may be applied to the touch driving circuit TDC of FIG. 4 as well as the touch driving circuit TDC1 of FIG. 9A. Here, each of the second switch signal SG12, the fourth switch signal SG14, the seventh switch signal SG22, and the ninth switch signal SG24 may have a low level in the first to fifth periods PH1 to PH5.

Figure 10:
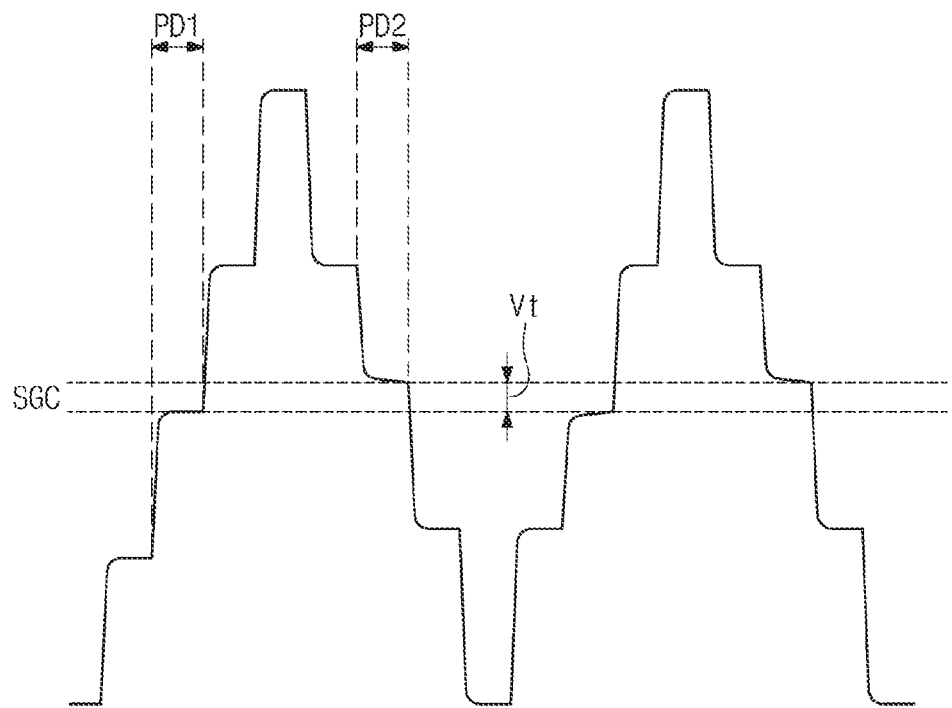
FIG. 10 is a view illustrating a waveform of a touch driving signal according to an exemplary embodiment of the inventive concept.

FIG. 10 is a view illustrating a waveform of a touch driving signal according to an exemplary embodiment of the inventive concept. Hereinafter, a touch driving circuit and a waveform of a touch driving signal according to an exemplary embodiment of the inventive concept will be described with reference to FIGS. 3, 6, and 10.

Referring again to FIG. 6, a signal having a waveform of the first touch driving signal SG1 during the first to ninth periods PR1 to PR9 may be referred to as an in-phase signal, and a waveform of the second touch driving signal SG2 during the first to ninth periods PR1 to PR9 may be referred to as an out-phase signal. The in-phase signal and the out-phase signal may be signals having phases that are opposite to each other and be delayed by half of a period.

As illustrated in FIG. 3, the transmission touch lines TX1 to TX5 of the touch sensing unit TS may be provided in plurality, and the plurality of transmission touch lines TX1 to TX5 may be driven at substantially the same time. When the transmission touch lines TX1 to TX5 are not sequentially driven but driven at substantially the same time, it may be necessary to distinguish the touch driving signals applied to the transmission touch lines TX1 to TX5. The touch driving signal may be distinguished from other touch driving signals by periodically mixing the in-phase signal and the out-phase signal.

Since the transmission touch lines TX1 to TX5 are driven at substantially the same time, a capacitor including the transmission touch lines TX1 to TX5 and the touch sensing lines RX1 to RX4 may further increase in capacitance. Thus, the touch sensing unit TS may be further improved in sensitivity.

The in-phase signal may be applied to portions of the plurality of transmission touch lines TX1 to TX5, and the out-phase signal may be applied to other portions of the transmission touch lines TX1 to TX5. Here, the number of transmission touch lines to which the in-phase signal is applied and the number of transmission touch lines to which the out-phase signal is applied may be different from each other.

When exemplarily describing the fifth period PR5 of FIG. 6, if the number of transmission touch lines to which the in-phase signal is applied is greater than that of transmission touch lines to which the out-phase signal is applied, a voltage level generated by sharing charges in the first transmission touch line TX1 and the second transmission touch line TX2 during the fifth period PR5 may be greater than the third level V3. For example, when the in-phase signal is applied to the first to third transmission touch lines TX1 to TX3 of the transmission touch lines TX1 to TX5 of FIG. 3, and the out-phase signal is applied to the fourth and fifth transmission touch lines TX4 and TX5, a voltage level generated by sharing charges in the first to fifth transmission touch lines TX1 to TX5 during the fifth period PR5 may be greater than the third level V3.

On the other hand, when the number of transmission touch lines to which the in-phase signal is applied is less than that of transmission touch lines to which the out-phase signal is applied, a voltage level generated by sharing charges in the first transmission touch line TX1 and the second transmission touch line TX2 during the fifth period PR5 may be less than the third level V3. For example, when the in-phase signal is applied to the first and second transmission touch lines TX1 and TX2 of the transmission touch lines TX1 to Tx5 of FIG. 3, and the out-phase signal is applied to the third to fifth transmission touch lines TX3 to TX5, a voltage level generated by sharing charges in the first to fifth transmission touch lines TX1 to TX5 during the fifth period PR5 may be less than the third level V3.

As described above, due to a difference in the number of transmission touch lines to which the in-phase signal and the out-phase signal are applied, the voltage levels of the first transmission touch line TX1 and the second transmission touch line TX2 in the periods in which the charges are shared by the first transmission touch line TX1 and the second transmission touch line TX2 may be different from each other.

Referring to FIG. 10, a first difference Vt between the voltage level in the first period PD1 in which the first transmission touch line TX2 and the second transmission touch line TX1 for the touch driving signal SGC share the charges and the voltage level in the second period PD2 is illustrated in FIG. 10.

Figure 11:
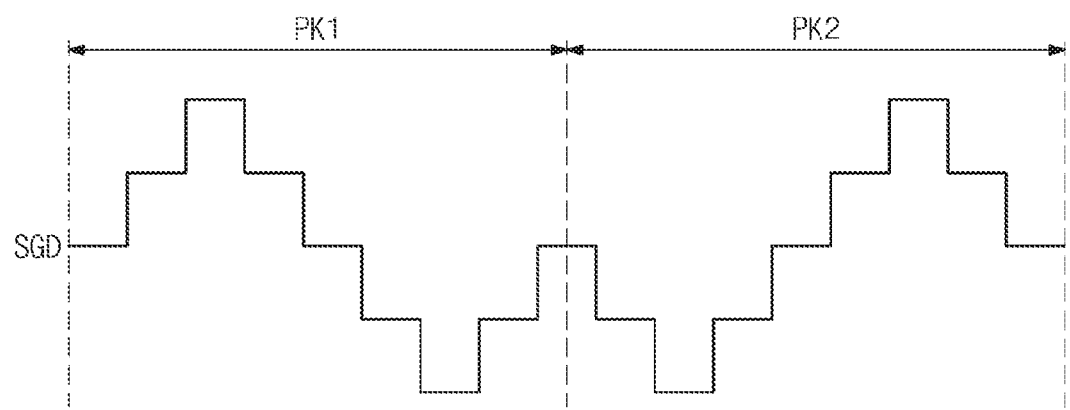
FIG. 11 is a view illustrating a waveform of a touch driving signal according to an exemplary embodiment of the inventive concept.

FIG. 11 is a view illustrating a waveform of a touch driving signal according to an exemplary embodiment of the inventive concept.

A touch driving signal SGD according to an exemplary embodiment of the inventive concept may be a signal having opposite phases during phase periods different from each other.

The touch driving signal SGD may have an in-phase signal during a first phase period PK1. Additionally, the touch driving signal SGD may have an out-phase signal during a second phase period PK2.

The touch driving signal SGD of FIG. 11 may be applied to each of the first and second touch driving signals SG1 and SG2, which are described with reference to FIG. 6.

In the display apparatus according to exemplary embodiments of the inventive concept, the touch driving circuit may provide the touch driving signal, which increases or decreases in stages, to the transmission touch lines, thus reducing the power consumed in the touch sensing unit.

Additionally, in the touch driving circuit for generating the touch driving signal that increases or decreases in stages, the number of capacitor devices may be reduced to reduce the manufacturing cost.

While the inventive concept has been shown and described with reference to exemplary embodiments thereof, it will be apparent to those of ordinary skill in the art that various changes and modifications in form and details may be made thereto without departing from the spirit and scope of the inventive concept as set forth in the following claims.

What is claimed is:

1. A display apparatus comprising:
   a display panel;
   a touch sensing unit disposed on the display panel and comprising a first transmission touch line and a second transmission touch line, which are spaced apart from each other; and
   a touch driving circuit configured to provide a first touch driving signal to the first transmission touch line and provide a second touch driving signal to the second transmission touch line,
   wherein the touch driving circuit comprises:
   a first switch group comprising a plurality of first switch group devices, each of which has one end coupled to the first transmission touch line;
   a second switch group comprising a plurality of second switch group devices, each of which has one end connected to the second transmission touch line; and
   a control switch group connected to the other end of at least a portion of the plurality of first switch group devices and the other end of at least a portion of the plurality of second switch group devices, comprising a plurality of control switch devices and a capacitor device, and configured to receive a driving voltage and a ground voltage, and
   wherein each of the first touch driving signal and the second touch driving signal has N voltage levels, where N is a natural number of 3 or more.

2. The display apparatus of claim 1, wherein the plurality of first switch group devices comprise:
   a first ground switch device having the other end configured to receive the ground voltage;
   a first intermediate switch device having the other end configured to receive the driving voltage; and
   a first driving switch device having the other end connected to the control switch group.

3. The display apparatus of claim 2, wherein the control switch group comprises:
   the capacitor device comprising a first electrode and a second electrode, which face each other;
   a first control switch device comprising one end configured to receive the driving voltage and the other end connected to the first electrode of the capacitor device;
   a second control switch device comprising one end configured to receive the ground voltage and the other end connected to the first electrode of the capacitor device;
   a third control switch device comprising one end configured to receive the driving voltage and the other end connected to the second electrode of the capacitor device; and
   a fourth control switch device comprising one end connected to the other end of the first control switch device and the other end connected to the second electrode of the capacitor device.

4. The display apparatus of claim 3, wherein the plurality of first switch group devices further comprise:
   a first lower switch device having the other end connected to the first electrode of the capacitor device; and
   a first upper switch device having the other end connected to the second electrode of the capacitor device.

5. The display apparatus of claim 4, wherein N is 5.

6. The display apparatus of claim 4, wherein the plurality of second switch group devices comprise:
   a second ground switch device having the other end configured to receive the ground voltage;
   a second intermediate switch device having the other end configured to receive the driving voltage; and
   a second driving switch device having the other end connected to the control switch group.

7. The display apparatus of claim 6, wherein the plurality of second switch group devices further comprise:
   a second lower switch device having the other end connected to the first electrode of the capacitor device; and
   a second upper switch device having the other end connected to the second electrode of the capacitor device.

8. The display apparatus of claim 7, wherein the first ground switch device, the first lower switch device, the first intermediate switch device, the first upper switch device, and the first driving switch device are turned on in sequence or in reverse order, and
   the second ground switch device, the second lower switch device, the second intermediate switch device, the second upper switch device, and the second driving switch device are turned on in sequence or in reverse order.

9. The display apparatus of claim 7, wherein the second control switch device and the third control switch device are turned on during the same period as the first intermediate switch device and the second intermediate switch device.

10. The display apparatus of claim 7, wherein the first control switch device and the fourth control switch device are turned on during a period in which the first ground switch device and the second driving switch device are turned on, and
    the first control switch device and the fourth control switch device are turned on during a period in which the first driving switch device and the second ground switch device are turned on.

11. The display apparatus of claim 1, wherein the first touch driving signal and the second touch driving signal have phases different from each other during a specific period.

12. The display apparatus of claim 1, wherein the first touch driving signal has a first phase during a first phase period and a second phase different from the first phase during a second phase period different from the first phase period.

13. The display apparatus of claim 1, wherein the touch sensing unit further comprises a plurality of sensing touch lines electrically connected to the first and second transmission touch lines.

14. The display apparatus of claim 1, wherein each of the first and second touch driving signals sequentially increases or decreases between the ground voltage and a double value of the driving voltage.

15. A display apparatus comprising:
    a display panel;
    a touch sensing unit disposed on the display panel and comprising a first transmission touch line and a second transmission touch line, which are spaced apart from each other; and
    a touch driving circuit configured to receive a ground voltage and a driving voltage, which are different from each other, comprising a plurality of switch devices and one capacitor device, configured to provide a first touch driving signal to the first transmission touch line, and configured to provide a second touch driving signal to the second transmission touch line,
    wherein each of the first touch driving signal and the second touch driving signal has N voltage levels, where N is a natural number of 3 or more, and
    each of the first touch driving signal and the second touch driving signal sequentially increases or decreases between the ground voltage and a double value of the driving voltage.

16. The display apparatus of claim 15, wherein N is 5, and
    each of the first touch driving signal and the second touch driving signal increases or decreases in units of half of a voltage difference between the driving voltage and the ground voltage.

* * * * *

UNITED STATES PATENT AND TRADEMARK OFFICE
CERTIFICATE OF CORRECTION

| | |
|---|---|
| PATENT NO. | : 10,942,597 B2 |
| APPLICATION NO. | : 16/503741 |
| DATED | : March 9, 2021 |
| INVENTOR(S) | : Deog-Kyoon Jeong et al. |

Page 1 of 1

It is certified that error appears in the above-identified patent and that said Letters Patent is hereby corrected as shown below:

On the Title Page

Item (30), insert:
--Foreign Application Priority Data
REPUBLIC OF KOREA 10-2018-0078680 07/06/2018--

Signed and Sealed this
Twentieth Day of April, 2021

Drew Hirshfeld
*Performing the Functions and Duties of the
Under Secretary of Commerce for Intellectual Property and
Director of the United States Patent and Trademark Office*